US008603358B2

(12) United States Patent
Kuriyama et al.

(10) Patent No.: US 8,603,358 B2
(45) Date of Patent: *Dec. 10, 2013

(54) LIQUID CRYSTAL COMPOSITION CONTAINING POLYMERIZABLE COMPOUND AND LIQUID CRYSTAL DISPLAY ELEMENT USING THE SAME

(75) Inventors: Takeshi Kuriyama, Saitama (JP); Shinichi Hirata, Saitama (JP); Shotaro Kawakami, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,034

(22) PCT Filed: Apr. 1, 2010

(86) PCT No.: PCT/JP2010/056009
§ 371 (c)(1),
(2), (4) Date: Dec. 22, 2011

(87) PCT Pub. No.: WO2010/119779
PCT Pub. Date: Oct. 21, 2010

(65) Prior Publication Data
US 2012/0097895 A1   Apr. 26, 2012

(30) Foreign Application Priority Data

Apr. 14, 2009  (JP) ................. 2009-097946

(51) Int. Cl.
*C09K 19/52* (2006.01)
*C09K 19/06* (2006.01)
*C09K 19/34* (2006.01)
*C09K 19/32* (2006.01)
*C09K 19/12* (2006.01)
*C09K 19/00* (2006.01)
*G02F 1/1333* (2006.01)

(52) U.S. Cl.
USPC ............. 252/299.6; 252/299.01; 252/299.61; 252/299.62; 252/299.63; 252/299.65; 252/299.66; 428/1.1; 349/86; 349/182

(58) Field of Classification Search
USPC ............. 252/299.01, 299.6, 299.61, 299.62, 252/299.63, 299.65, 299.66; 428/1.1; 349/86, 182
See application file for complete search history.

(56) References Cited

U.S. PATENT DOCUMENTS

| 5,056,898 A | 10/1991 | Ma et al. |
| 5,223,959 A | 6/1993 | Wu et al. |
| 8,440,101 B2 * | 5/2013 | Kuriyama et al. ....... 252/299.01 |
| 2004/0011996 A1 | 1/2004 | Klasen-Memmer et al. |
| 2005/0227021 A1 | 10/2005 | Harding et al. |
| 2011/0186776 A1 * | 8/2011 | Kuriyama et al. ....... 252/299.61 |

FOREIGN PATENT DOCUMENTS

| JP | 5-500273 A | 1/1993 |
| JP | 2000-109843 A | 4/2000 |
| JP | 2000-119653 A | 4/2000 |
| JP | 2003-307720 A | 10/2003 |
| JP | 2004-131704 A | 4/2004 |
| JP | 2005-120091 A | 5/2005 |
| JP | 2005-221617 A | 8/2005 |
| JP | 2008-116931 A | 5/2008 |

* cited by examiner

*Primary Examiner* — Geraldina Visconti
(74) *Attorney, Agent, or Firm* — McDermott Will & Emery LLP

(57) ABSTRACT

A liquid crystal composition containing a polymerizable compound according to the present invention is used in a liquid crystal display element to which a liquid crystal alignment capability is provided by polymerization. The composition contains a polymerizable compound that polymerizes without a photopolymerization initiator or with only an extremely small amount of photopolymerization initiator. Therefore, the alignment after the polymerization becomes more stable and the display characteristics do not degrade. Thus, the polymerizable compound is suitable as a practical component of the liquid crystal composition. A liquid crystal display element that uses the liquid crystal composition containing a polymerizable compound according to the present invention can be suitably used for VA and IPS liquid crystal display elements.

7 Claims, No Drawings

LIQUID CRYSTAL COMPOSITION CONTAINING POLYMERIZABLE COMPOUND AND LIQUID CRYSTAL DISPLAY ELEMENT USING THE SAME

CROSS REFERENCE TO PRIOR APPLICATIONS

This application is a U.S. National Phase application under 35 U.S.C. §371 of International Application No. PCT/JP2010/056009, filed on Apr. 1, 2010 and claims benefit of priority to Japanese Patent Application No. 2009-097946, filed on Apr. 14, 2009. The international Application was published in Japanese on Oct. 21, 2010 as WO 2010/119779 A1 under PCT Article 21(2). The contents of the applications are hereby incorporated by reference.

TECHNICAL FIELD

The present invention relates to a liquid crystal composition containing a polymerizable compound and to a liquid crystal display element using the liquid crystal composition.

BACKGROUND ART

In the production of MVA mode liquid crystal displays, there has been introduced a technology in which a liquid crystal material containing a polymerizable monomer is injected between substrates and the monomer is polymerized while applying a voltage so that the direction in which liquid crystal molecules are tilted is memorized. However, a polymerization initiator used for the polymerization of a monomer and a monomer that is left because of insufficient polymerization have caused a problem such as image sticking on liquid crystal display elements. Therefore, in the production of liquid crystal display elements to which a liquid crystal alignment capability is provided by polymerizing a monomer in such a liquid crystal material, the development of a liquid crystal composition that is polymerized without using a polymerization initiator and whose monomer is completely consumed through the polymerization process has been demanded. Furthermore, it has been demanded in the actual use that high compatibility between a monomer and a liquid crystal material is achieved and a required level of alignment after polymerization is satisfied.

Conventionally, an element (refer to PTL 1) produced using a compound having a structure such as a 1,4-phenylene group and an element (refer to PTL 2) that uses a compound having a biaryl structure have been proposed to prevent image sticking. However, the polymerizable compounds disclosed in PTLs 1 and 2 are not polymerized when a photopolymerization initiator is not contained, or an unpolymerized monomer is left and such a residual material may adversely affect liquid crystal display elements. Furthermore, a production method (refer to PTL 3) that prevents image sticking by polymerizing a polymerizable compound with energy rays and then performing a heat treatment has been proposed. However, also in this method, a polymerizable compound is not necessarily completely polymerized and thus an unpolymerized residual material may adversely affect liquid crystal display elements as in the methods described above.

CITATION LIST

Patent Literature

PTL 1: Japanese Unexamined. Patent Application Publication No. 2003-307720
PTL 2: Japanese Unexamined Patent Application Publication No. 2008-116931
PTL 3: Japanese Unexamined Patent Application Publication No. 2005-221617

SUMMARY OF INVENTION

Technical Problem

An object of the present invention is to provide a liquid crystal composition containing a polymerizable compound that is not left or is left in only an extremely small amount even if the polymerizable compound is polymerized without using a photopolymerization initiator, and a liquid crystal composition containing a polymerizable compound that has high compatibility between the polymerizable compound and a liquid crystal material, that has more stable alignment after polymerization, and that causes no degradation of display characteristics. Furthermore, another object of the present invention is to provide a liquid crystal display element to which a liquid crystal alignment capability is provided by polymerizing the liquid crystal composition containing a polymerizable compound, and that has high display performance.

Solution to Problem

As a result of research on various polymerizable compounds and various unpolymerizable compounds, the inventors of the present invention have found that a liquid crystal composition composed of a polymerizable compound having a certain structure and a liquid crystal material, can achieve the above-described object, and have completed the present invention.

The present invention provides a liquid crystal composition including:

as a first component, at least one compound selected from polymerizable compounds represented by general formula (I):

[Chem. 1]

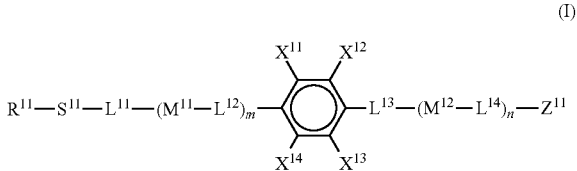

(I)

(wherein $R^{11}$ is selected from structures represented by formulae (R-1) to (R-15) below:

[Chem. 2]

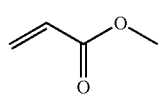

(R-1)

-continued

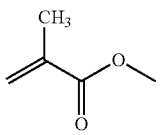
(R-2)

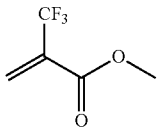
(R-3)

(R-4)

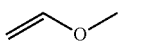
(R-5)

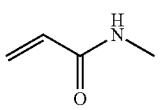
(R-6)

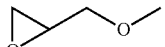
(R-7)

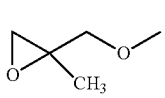
(R-8)

(R-9)

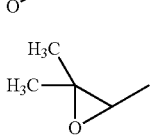
(R-10)

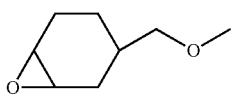
(R-11)

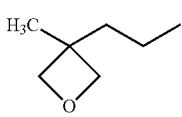
(R-12)

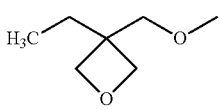
(R-13)

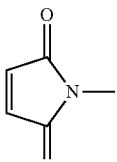
(R14)

(R-15)

$S^{11}$ represents a single bond or an alkylene group having 1 to 12 carbon atoms, where a methylene group in the alkylene group may be substituted with an oxygen atom, —COO—, —OCO—, or —OCOO— as long as oxygen atoms are not directly bonded to each other, $Z^{11}$ represents a hydrogen atom, a fluorine atom, a chlorine atom, a cyano group, a thiocyanate group, a trifluoromethoxy group, a trifluoromethyl group, a difluoromethoxy group, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, or —$S^{12}$—$R^{12}$ (wherein $R^{12}$ independently has the same meaning as $R^{11}$, and $S^{12}$ independently has the same meaning as $S^{11}$), $X^{11}, X^{12}, X^{13}$, and $X^{14}$ each independently represent a hydrogen atom, an alkyl group, an alkyl halide group, an alkoxy group, an alkoxy halide group, a halogen, a cyano group, or a nitro group, $L^{11}, L^{12}$, and $L^{14}$ each independently represent a single bond, —O—, —S—, —$CH_2$—, —$OCH_2$—, —$CH_2O$—, —CO—, —$C_2H_4$—, —COO—, —COO—, —$OCOOCH_2$—, —$CH_2OCOO$—, —CO—$NR^a$—, —$NR^a$—CO—, —$SCH_2$—, —$CH_2S$—, —CH=CH—COO—, —COO—CH=CH—, OCO—CH=CH—, —CH=CH—OCO—, —$COOC_2H_4$—, —$OCOC_2H_4$—, —$C_2H_4OCO$—, —$C_2H_4COO$—, —$OCOCH_2$—, —$CH_2COO$—, —CH=CH—, —CF=CH—, —CH=CF—, —$CF_2$—, —$CF_2O$—, $OCF_2$—, $CF_2CH_2$, $CH_2CF_2$—, —$CF_2CF_2$—, or —C≡C— (where $R^a$ represents an alkyl group having 1 to 4 carbon atoms), $L^{13}$ represents —CH=CH—COO—, —CH=CH—OCO—, —COO—CH=CH—, or —OCO—CH=CH—, $M^{11}$ and $M^{12}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group, where hydrogen atoms in the groups of $M^{11}$ and $M^{12}$ are each independently unsubstituted or substituted with a fluorine atom, a chlorine atom, a cyano group, an alkyl group having 1 to 8 carbon atoms, an alkyl halide group, an alkoxy halide group, an alkoxy group, or a nitro group, and m represents 0 or 1 and n represents 1, 2, or 3, wherein when n represents 2 or 3, two or three $M^{12}$s may be the same as or different from each other and two or three $L^{14}$s may be the same as or different from each other);

as a second component, at least one compound represented by general formula (II)

[Chem. 3]

$$R^{21}\text{-}M^{21}\text{-}L^{21}\text{-}M^{22}\text{-}(L^{22}\text{-}M^{23})_o\text{-}R^{22} \quad \text{(II)}$$

(wherein $R^{21}$ and $R^{22}$ independently represent an alkyl group having 1 to 10 carbon atoms or an alkenyl group having 2 to 10 carbon atoms, where a methylene group or two or more methylene groups that are not adjacent to each other in these groups may be substituted with —O— or —S—, and at least one hydrogen atom in these groups may be substituted with a fluorine atom or a chlorine atom, $M^{21}, M^{22}$, and $M^{23}$ each independently represent a group selected from:

(a) a trans-1,4-cyclohexylene group (a methylene group or two or more methylene groups that are not adjacent to each other in this group may be substituted with —O— or —S—), (b) a 1,4-phenylene group (one —CH= or two or more —CH= that are not adjacent to each other in this group may be substituted with a nitrogen atom), a 3-fluoro-1,4-phenylene group, and a 3,5-difluoro-1,4-phenylene group, and (c) a 1,4-cyclohexenylene group, a 1,4-bicyclo(2,2,2)octylene group, a piperidine-2,5-diyl group, a naphthalene-2,6-diyl group, a decahydronaphthalene-2,6-diyl group, and a 1,2,3,4-tetrahydronaphthalene-2,6-diyl group, represents 0, 1, or 2, $L^{21}$ and $L^{22}$ each independently represent a single bond, —$CH_2CH_2$—, —$(CH_2)_4$—, $OCH_2$—, —$CH_2O$—, —$CF_2$—, —$CF_2O$—, —$OCH_2$—, —CH=CH—, —CH=N—N=CH—, or —C≡C—, wherein when a plurality of $L^{22}$s are present, $L^{22}$s may be the same as or different from each other, and when a plurality of $M^{23}$s are present, $M^{23}$s may be the same as or different from each other); and as a third component, at least one compound selected from the group consisting of compounds represented by general formulae (IIIa), (IIIb), and (IIIc) or the group consisting of compounds represented by general formulae (IVa), (IVb), and (IVc):

[Chem. 4]

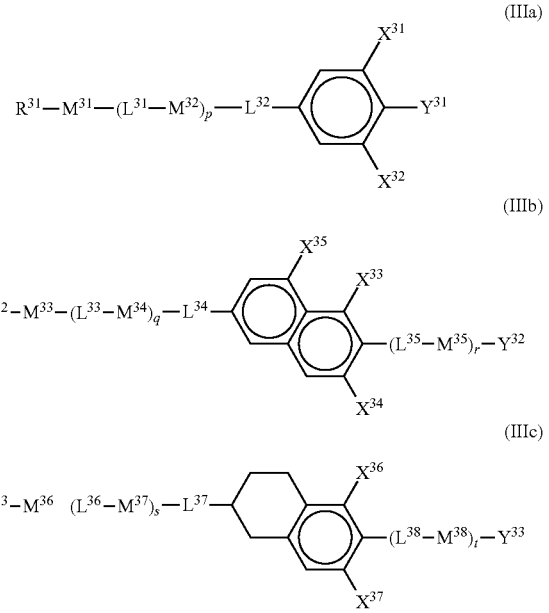

(wherein $R^{31}$, $R^{32}$, and $R^{33}$ each independently represent an alkyl group having 1 to 10 carbon atoms or an alkenyl group having 2 to 10 carbon atoms, where a methylene group or two or more methylene groups that are not adjacent to each other in these groups may be substituted with —O— or —S—, and at least one hydrogen atom in these groups may be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from:
(d) a trans-1,4-cyclohexylene group (a methylene group or two or more methylene groups that are not adjacent to each other in this group may be substituted with —O— or —S—),
(e) a 1,4-phenylene group (one —CH= or two or more —CH= that are not adjacent to each other in this group may be substituted with a nitrogen atom), a 3-fluoro-1,4-phenylene group, and a 3,5-difluoro-1,4-phenylene group, and
(f) a 1,4-cyclohexenylene group, a 1,4-bicyclo(2,2,2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), groups (a), or groups (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —COO—, —$CH_2CH_2$—, —$(CH_2)_4$—, —$OCH_2$—, —$CH_2O$—, —$OCF_2$—, —$CF_2O$—, or —C≡C—, wherein when a plurality of $M^{32}$s, $M^{34}$s, $M^{35}$s, $M^{37}$s, $M^{38}$s, $L^{31}$s, $L^{33}$s, $L^{35}$s, $L^{36}$s, and/or $L^{38}$s are present, they may be the same or different, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ independently represent a hydrogen atom, a fluorine atom, a chlorine atom, a cyano group, a thiocyanate group, a trifluoromethoxy group, a trifluoromethyl group, a 2,2,2-trifluoroethyl group, or a difluoromethoxy group, at least one of $X^{31}$, $X^{32}$, and $Y^{31}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of hydrogen atoms in $M^{31}$ or $M^{32}$ represents a cyano group, a fluorine atom, a trifluoromethyl group, a trifluoromethoxy group, or a chlorine atom, at least one of $X^{33}$, $X^{34}$, $X^{36}$, and $Y^{32}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of hydrogen atoms in $M^{33}$, $M^{34}$, or $M^{35}$ represents a cyano group, a fluorine atom, a trifluoromethyl group, a trifluoromethoxy group, or a chlorine atom, at least one of $M^{36}$, $M^{37}$, and $M^{38}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of hydrogen atoms in $M^{36}$, $M^{37}$, or $M^{38}$ represents a cyano group, a fluorine atom, a trifluoromethyl group, a trifluoromethoxy group, or a chlorine atom, and p, q, r, s, and t each independently represent 0, 1, or 2, where q+r and s+t are each 2 or less),

[Chem. 5]

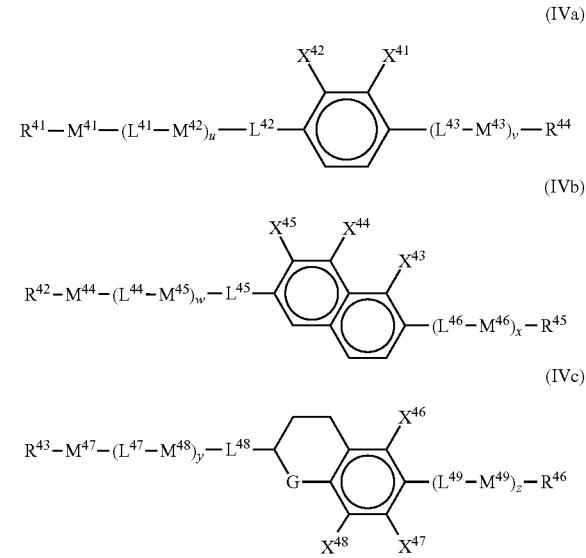

(wherein $R^{41}$, $R^{42}$, $R^{43}$, $R^{44}$, $R^{45}$, and $R^{46}$ each independently represent an alkyl group having 1 to 10 carbon atoms or an alkenyl croup having 2 to 10 carbon atoms, where a methylene group or two or more methylene groups that are not adjacent to each other in these groups may be substituted with —O— or —S—, and at least one hydrogen atom in these groups may be substituted with a fluorine atom or a chlorine atom, $M^{41}$, $M^{42}$, $M^{43}$, $M^{44}$, $M^{45}$, $M^{46}$, $M^{47}$, $M^{48}$, and $M^{49}$ each independently represent a group selected from:

(d) a trans-1,4-cyclohexylene group (a methylene group or two or more methylene groups that are not adjacent to each other in this group may be substituted with —O— or —S—), (e) a 1,4-phenylene group (one —CH═ or two or more —CH═ that are not adjacent to each other in this group may be substituted with a nitrogen atom), and (f) a 1,4-cyclohexenylene group, a 1,4-bicyclo(2,2,2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), group (e), or groups (f) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO— —CH$_2$CH$_2$—, —(CH$_2$)$_4$—, —OCH$_2$—, —OCF$_2$—, —CF$_2$O—, or —C≡C—, wherein when a plurality of $M^{42}$s, $M^{43}$s, $M^{43}$s, $M^{45}$s, $M^{46}$s, $M^{48}$s, $M^{49}$s, $L^{41}$s, $L^{43}$s, $L^{44}$s, $L^{46}$s, $L^{47}$s, and/or $L^{49}$s are present, they may be the same or different, $X^{41}$ and $X^{42}$ independently represent a trifluoromethyl group, a trifluoromethoxy group, or a fluorine atom and $X^{43}$, $X^{44}$, $X^{45}$, $X^{46}$, $X^{47}$ and $X^{48}$ each independently represent a hydrogen atom, a trifluoromethyl group, a trifluoromethoxy group, or a fluorine atom, but at least one of $X^{41}$ and $X^{42}$ represents a fluorine atom, at least one of $X^{43}$, $X^{44}$, and $X^{45}$ represents a fluorine atom, and at least one of $X^{49}$, $X^{47}$ and $X^{48}$ represents a fluorine atom, where $X^{46}$ and $X^{47}$ do not represent fluorine atoms at the same time and $X^{46}$ and $X^{48}$ do not represent fluorine atoms at the same time, G represents a methylene group or —O—, and u, v, w, x, y, and z each independently represent 0, 1, or 2, where u+v, w+x, and y+z are each 2 or less). The present invention also provides a liquid crystal display element, using the liquid crystal composition.

Advantageous Effects of Invention

Since the polymerizable compound of the present invention is highly compatible with other liquid crystal materials, a stable liquid crystal composition can be obtained. In a liquid crystal composition containing the polymerizable compound, the polymerizable compound can be polymerized without using a photopolymerization initiator or with only a small amount of photopolymerization initiator, and an unpolymerized polymerizable compound is not left or is left in only an extremely small amount after the polymerization. This significantly suppresses the display failure of a liquid crystal display element to which an alignment is provided by polymerizing the polymerizable compound contained in the liquid crystal material. Therefore, the liquid crystal composition is useful as a liquid crystal material for the liquid, crystal display element.

DESCRIPTION OF EMBODIMENTS

A polymerizable compound used in the liquid crystal composition containing a polymerizable compound according to the present invention is a compound represented by the general formula (I). In the general, formula (I), $R^{11}$ represents a polymerizable group, and the following structures are exemplified as the polymerizable group.

[Chem. 6]

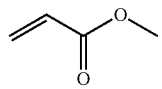
(R-1)

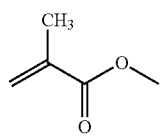
(R-2)

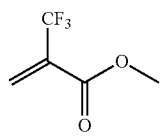
(R-3)

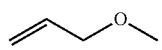
(R-4)

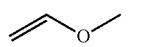
(R-5)

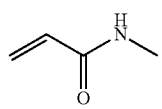
(R-6)

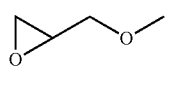
(R-7)

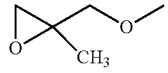
(R-8)

(R-9)

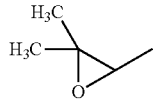
(R-10)

(R-11)

(R-12)

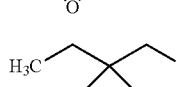
(R-13)

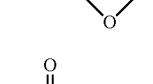
(R14)

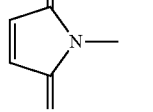
(R-15)

These polymerizable groups are cured by radical polymerization, radical addition polymerization, cationic polymerization, or anionic polymerization. In particular, when ultraviolet polymerization is performed as a polymerization method, formula (R-1), formula (R-2), formula (R-4), formula (R-5), formula (R-7), formula (R-11), formula (R-13), or formula (R-15) is preferred; formula (R-1), formula (R-2), formula (R-7), formula (R-11), or formula (R-13) is more preferred; and formula (R-1) or formula (R-2) is further preferred.

$S^{11}$ represents a spacer group or a single bond. The spacer group is preferably a single bond or an alkylene group having 1 to 12 carbon atoms, where a methylene group in the alkylene group may be substituted with an oxygen atom, —COO—, —OCO—, or —OCOO— as long as oxygen atoms are not directly bonded to each other.

$Z^{11}$ preferably represents a hydrogen atom, a fluorine atom, a chlorine atom, a cyano group, a thiocyanate group, a trifluoromethoxy group, a trifluoromethyl group, a difluoromethoxy group, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, or —$S^{12}$—$R^{12}$; more preferably a hydrogen atom, a fluorine atom, an alkyl group having 1 to 12 carbon atoms, where a methylene group in the alkyl group may be substituted with an oxygen atom, —CO—, —COO—, —OCO—, or —OCO— as long as oxygen atoms are not directly bonded to each other, or —$S^{12}$—$R^{12}$; further preferably an alkyl group having 1 to 12 carbon atoms, where a methylene group in the alkyl group may be substituted with an oxygen atom as long as oxygen atoms are not directly bonded to each other or —$S^{12}$—$R^{21}$. $R^{12}$ independently has the same meaning as $R^{11}$, and $S^{12}$ independently has the same meaning as $S^{11}$. When $Z^{11}$ represents —$S^{12}$—$R^{12}$—, $S^{11}$ and $S^{12}$ each independently represent a spacer group or a single bond as described above. The spacer group is preferably a single bond or an alkylene group having 2 to 12 carbon atoms; and preferably a single bond or an alkylene group having 2 to 12 carbon atoms, where a methylene group in the alkylene group may be substituted with an oxygen atom, —COO—, —OCO—, or —OCOO— as long as oxygen atoms are not directly bonded to each other. More preferably, the spacer group of at least one of $S^{11}$ and $S^{12}$ is an alkylene group having 2 to 12 carbon atoms, where a methylene group in the alkylene group may be substituted with an oxygen atom, —COO—, —OCO—, or —OCOO— as long as oxygen atoms are not directly bonded to each other.

$X^{11}$, $X^{12}$, $X^{13}$, and $X^{14}$ each independently preferably represent a hydrogen atom, an alkyl group, an alkyl halide group, an alkoxy group, an alkoxy halide group, a halogen, a cyano group, or a nitro group; more preferably a hydrogen atom, an alkyl group, an alkyl halide group, an alkoxy group, an alkoxy halide group, or a halogen; and further preferably a hydrogen atom, an alkyl group, an alkoxy group, or a halogen.

$L^{11}$, $L^{12}$, and $L^{14}$ each independently preferably represent a single bond, —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —CO—$NR^a$—, —$NR^a$—CO—, —$SCH_2$—, —$CH_2S$—, —CH=CH—COO—, —COO—CH=CH—, —OCO—CH=CH—OCO—, —CH=CH—, —$COOC_2H_4$—, —$OCOC_2H_4$—, —$C_2H_4OCO$—, —$C_2H_4COO$—, —$OCOC_2H_2$—, —$CH_2COO$—, —CH=CH—, —CF=CH—, —CH=CF—, —$CF_2$—, —$CF_2O$—, —$OCF_2$—, —$CF_2CH_2$—, —$CH_2CF_2$—, —$CF_2CF_2$—, or —C≡C— (where $R^a$ represents an alkyl group having 1 to 4 carbon atoms); more preferably a single bond —O—, —$OCH_2$—, —$CH_2O$—, —CO—, —$C_2H_4$—, —COO—, —OCO—, —$OCOOCH_2$—, —$CH_2OCOO$—, —CH=CH—COO—, —COO—CH=CH—, —OCO—CH=CH—OCO—, —$COOC_2H_4$—, —$OCOC_2H_4$—, —$C_2H_4OCO$—, —$C_2H_4COO$—, —$OCOCH_2$—, —$CH_2COO$—, or —CH=CH—; and further preferably a single bond, —O—, —$OCH_2$—, —$CH_2O$—, —CH=CH—COO—, —COO—CH=CH—, —OCO—CH=CH—OCO—, —$COOC_2H_4$—, —$OCOC_2H_4$—, —$C_2H_4OCO$—, —$C_2H_4COO$—, —$OCOC—H_2$—, —$CH_2COO$—, or —CH=CH—.

$L^{13}$ preferably represents —CH=CH—COO—, —CH=CH—OCO—, —COO—CH=CH—, or —OCO—CH=CH—; and more preferably —CH=CH—COO— or —OCO—CH=CH—.

$M^{11}$ and $M^{12}$ each independently preferably represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group; more preferably a 1,4-phenylene group, a 1,4-cyclohexylene group, a naphthalene-2,6-diyl group, or a tetrahydronaphthalene-2,6-diyl group; and particularly preferably a 1,4-phenylene group or a 1,4-cyclohexylene group. Hydrogen atoms in the groups of $M^{11}$ and $M^{12}$ are each independently preferably unsubstituted or substituted with a fluorine atom, a chlorine atom, a cyano group, an alkyl group having 1 to 8 carbon atoms, an alkyl halide group, an alkoxy halide group, an alkoxy group, or a nitro group; more preferably unsubstituted or substituted with a fluorine atom, an alkyl group having 1 to 8 carbon atoms, or an alkoxy group; and particularly preferably unsubstituted or substituted with a fluorine atom.

Herein, m represents 0 or 1 and n represents 1, 2, or 3. When n represents 2 or 3, two or three $M^{12}$s may be the same as or different from each other and two or three $L^{14}$s may be the same as or different from each other.

More specifically, the compound represented by the general formula (I) is preferably selected from compounds represented by general formulae (I-1) to (I-39) below.

[Chem. 7]

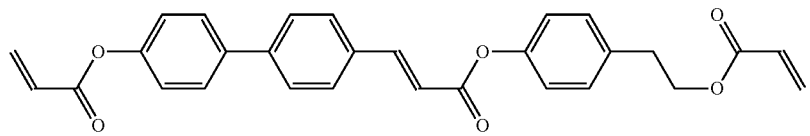

(I-1)

-continued
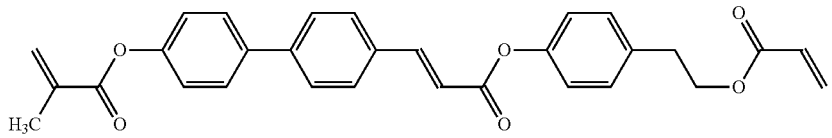
(I-2)
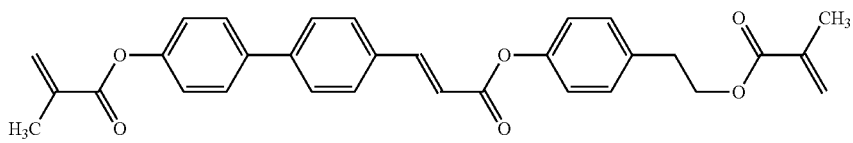
(I-3)
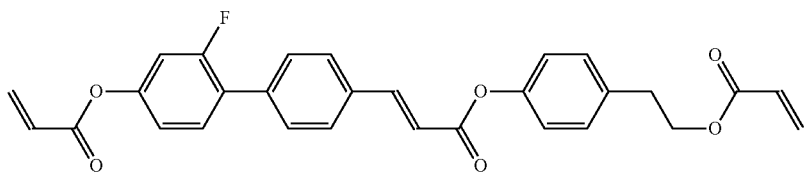
(I-4)
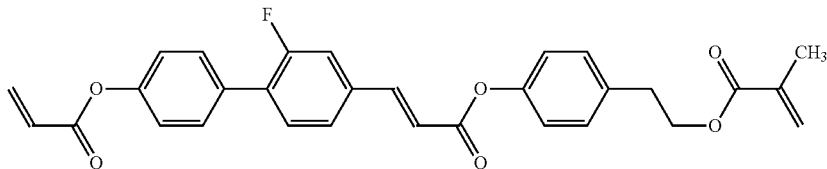
(I-5)
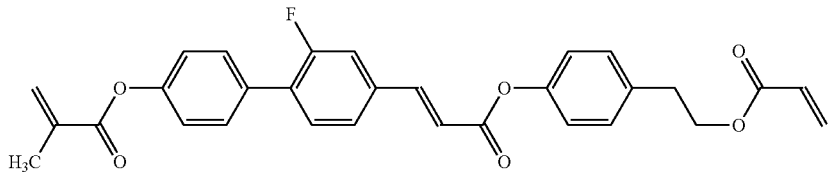
(I-6)
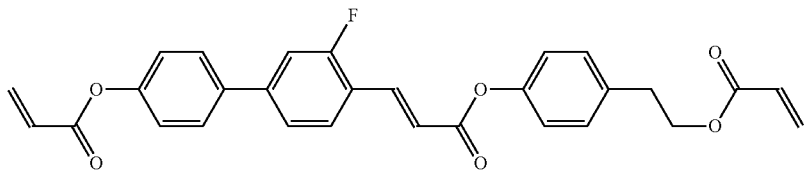
(I-7)
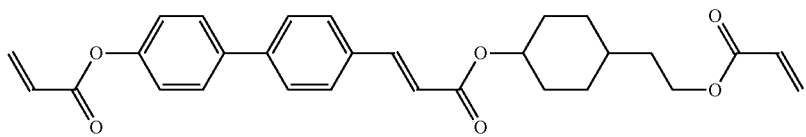
(I-8)
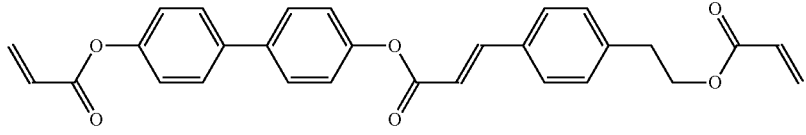
(I-9)
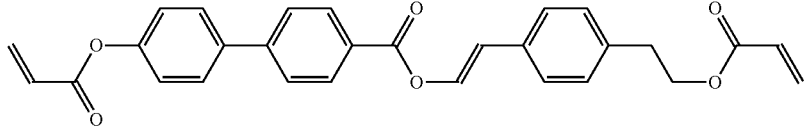
(I-10)

-continued
(I-11)
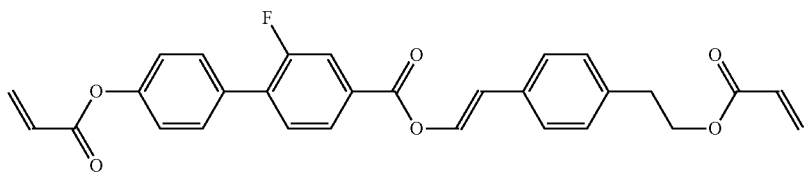
(I-12)
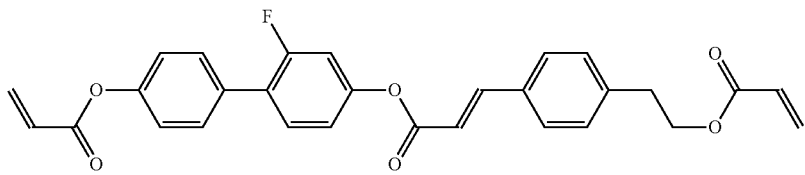
(I-13)
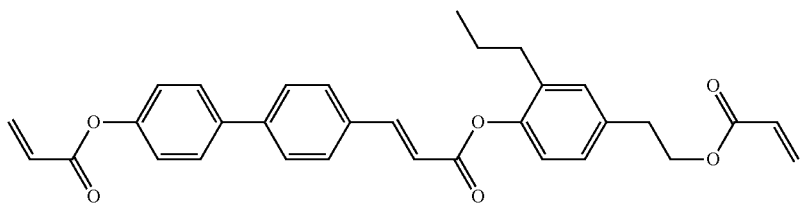
[Chem. 8]
(I-14)
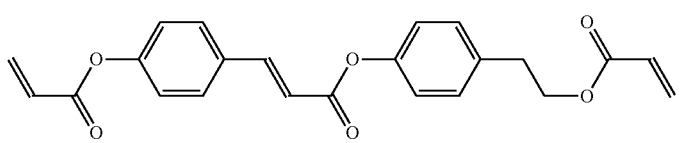
(I-15)
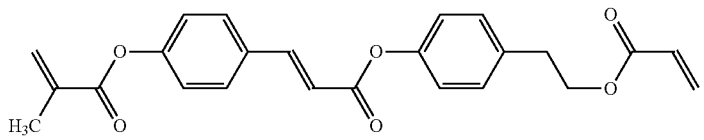
(I-16)
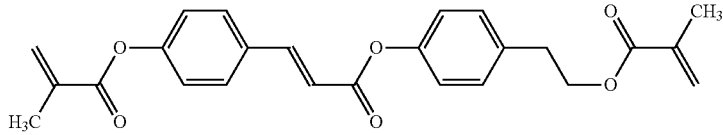
(I-17)
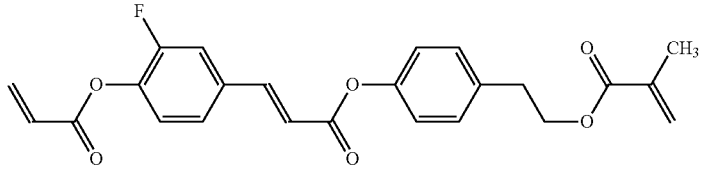
(I-18)
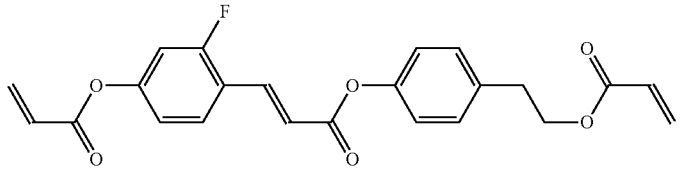
[Chem. 9]
(I-19)
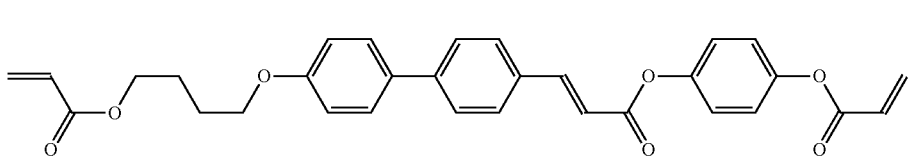

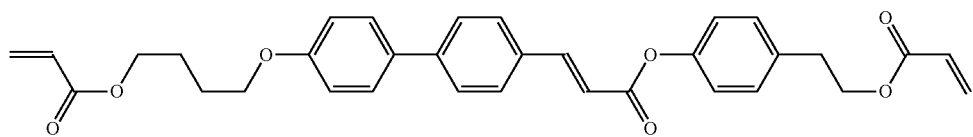
(I-20)
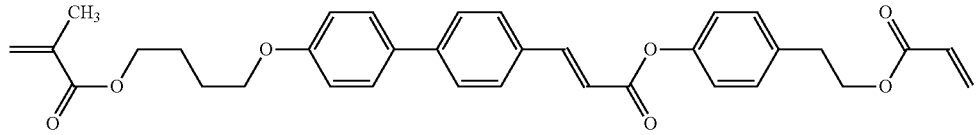
(I-21)
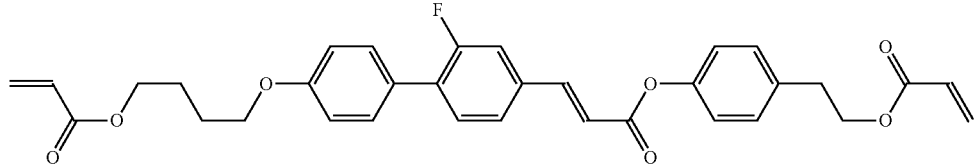
(I-22)
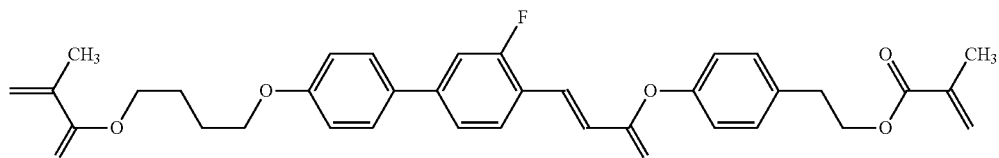
(I-23)
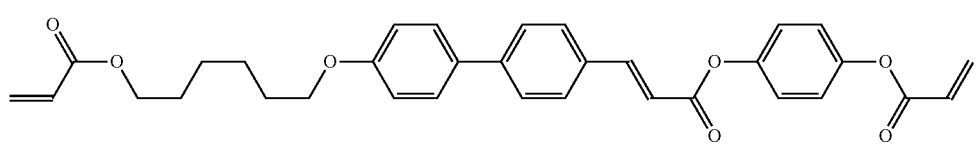
(I-24)
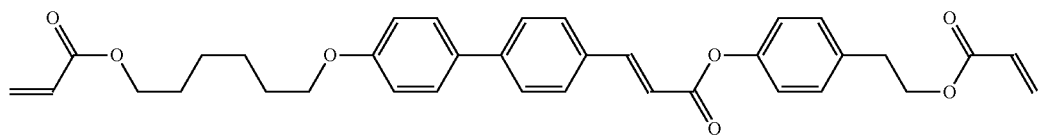
(I-25)
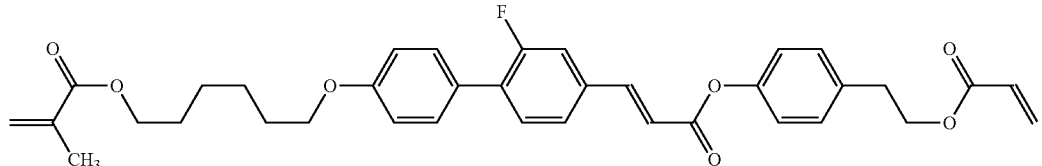
(I-26)
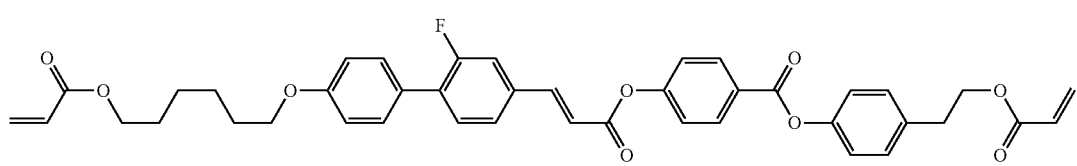
(I-27)
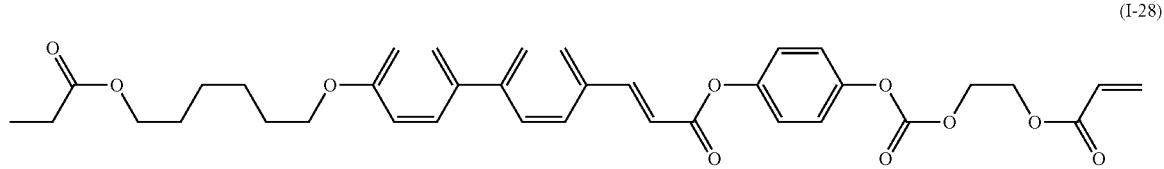
(I-28)
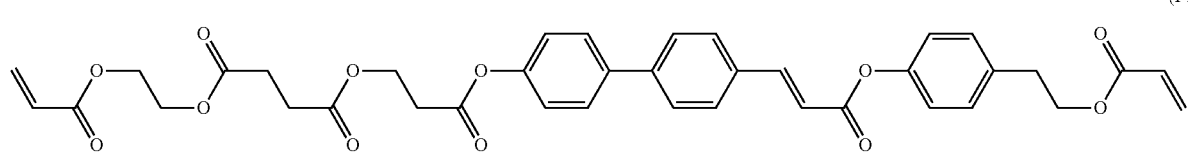
(I-29)

-continued
(I-30)
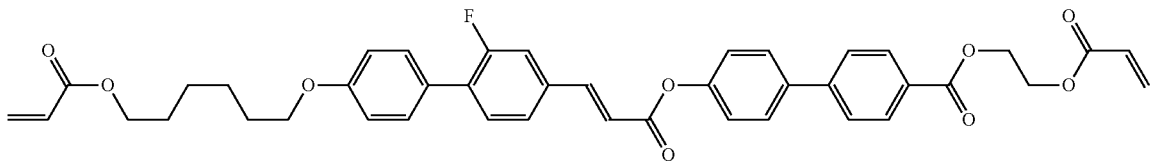
[Chem. 10]
(I-31)
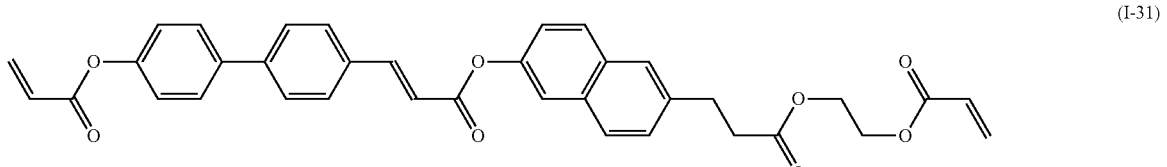
(I-32)
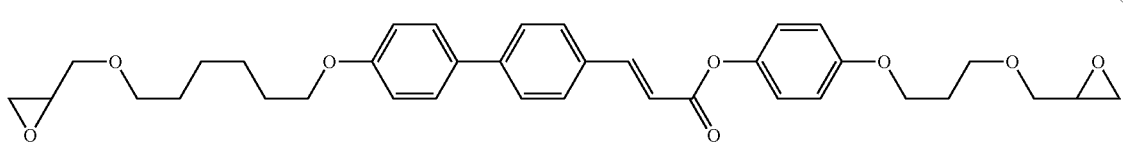
(I-33)
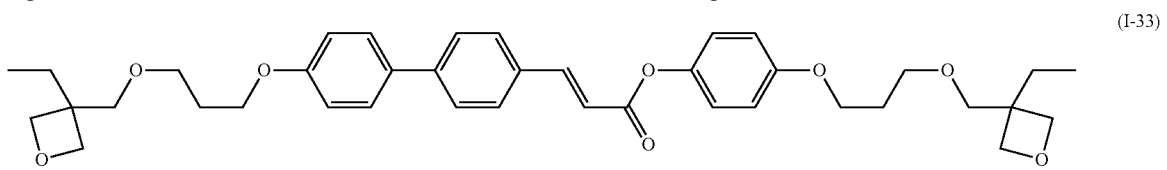
(I-34)
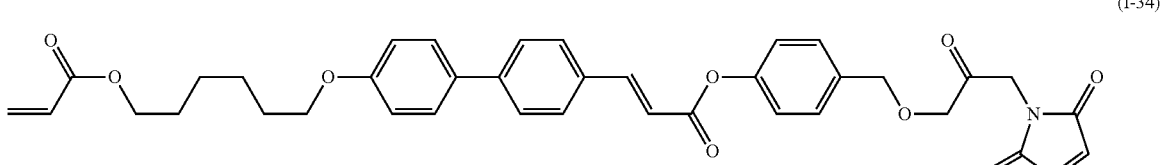
(I-35)
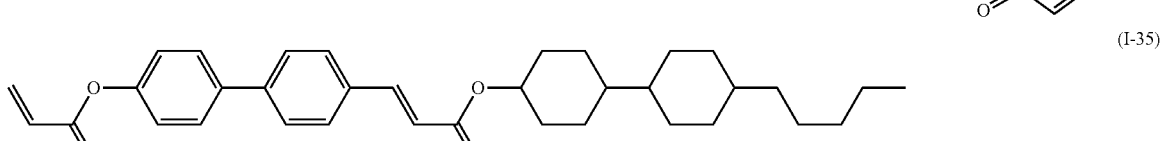
[Chem. 11]
(I-36)
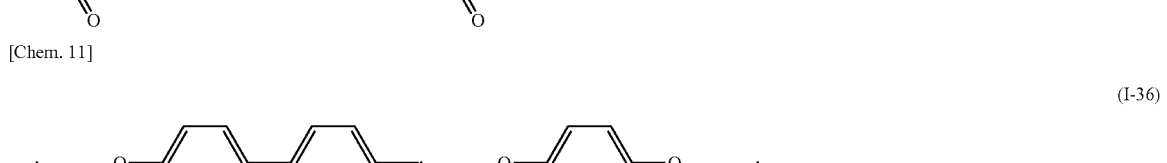
(I-37)
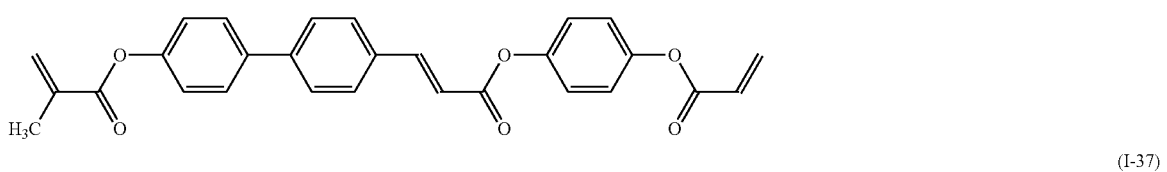
(I-38)
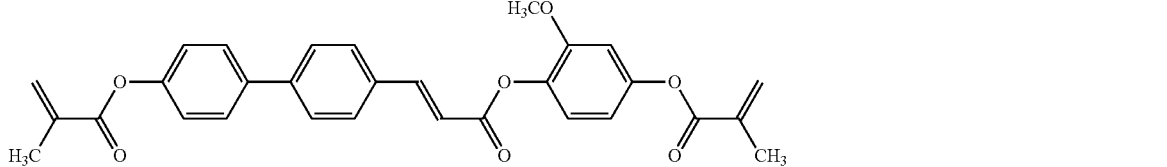

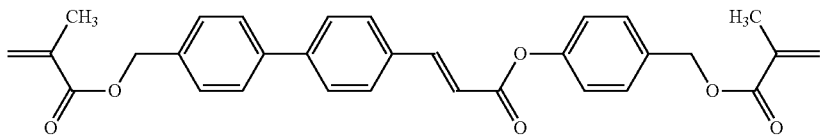
(I-39)

The compound represented by the general formula (I) is more preferably selected from compounds represented by general formulae (I-1) to (I-30) and (I-36) to (I-39).

The liquid crystal composition containing a polymerizable compound according to the present invention contains one or more polymerizable compounds represented by the general formula (I), preferably contains one to five of the polymerizable compounds, and particularly preferably contains one to three of the polymerizable compounds. The lower limit of the content of the compounds represented by the general formula (I) is preferably 0.01% by mass and more preferably 0.03% by mass. The upper limit of the content is preferably 2.0% by mass and more preferably 1.0% by mass.

In the compound represented by general formula (II) and used as a second component, $R^{21}$ and $R^{22}$ each independently preferably represent an alkyl group having 1 to 10 carbon atoms or an alkenyl group having 2 to 10 carbon atoms (a methylene group or two or more methylene groups that are not adjacent to each other in these groups may be substituted with —O— or —S—, and at least one hydrogen atom in these groups may be substituted with a fluorine atom or a chlorine atom); more preferably an alkyl group having 1 to 5 carbon atoms, an alkoxy group having 1 to 5 carbon atoms, an alkenyl group having 2 to 5 carbon atoms, or an alkenyloxy group having 3 to 6 carbon atoms; and particularly preferably an alkyl group having 1 to 5 carbon atoms or an alkoxy group having 1 to 5 carbon atoms.

$M^{21}$, $M^{22}$, and $M^{23}$ each independently preferably represent a trans-1,4-cyclohexylene group (a $C_2$ group or two $CH_2$ groups that are not adjacent to each other in this group may be substituted with an oxygen atom), a 1,4-phenylene group (at least one CH group in this group may be substituted with a nitrogen atom), a 3-fluoro-1,4-phenylene group, a 3,5-difluoro-1,4-phenylene group, a 1,4-cyclohexenylene group, a 1,4-bicyclo[2,2,2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; more preferably a trans-1,4-cyclohexylene group, a 1,4-phenylene group, or a 1,4-bicyclo[2,2,2]octylene group; and particularly preferably a trans-1,4-cyclohexylene group or a 1,4-phenylene group. Herein, o preferably represents 0, 1, or 2 and more preferably 0 or 1. $L^{21}$ and $L^{22}$ each independently preferably represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—; more preferably a single bond, —CH$_2$CH$_2$—, —(CH$_2$)$_4$—, —OCH$_2$—, or —CH$_2$O—; and further preferably a single bond or —CH$_2$CH$_2$—. More specifically, the compound of the general formula (II) is preferably a compound selected from the group of compounds represented by general formulae (II-A) to (II-P).

[Chem. 12]

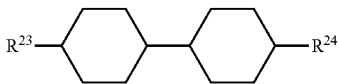
(II-A)

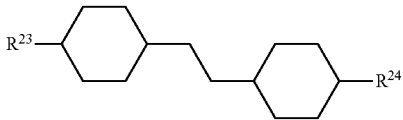
(II-B)

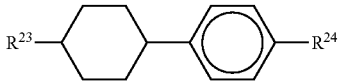
(II-C)

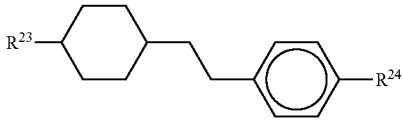
(II-D)

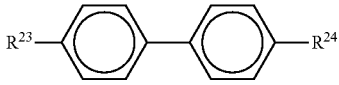
(II-E)

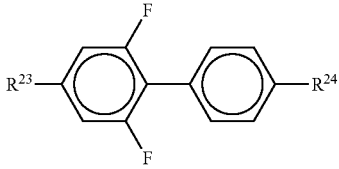
(II-F)

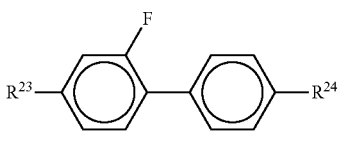
(II-G)

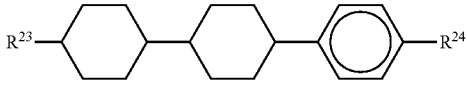
(II-H)

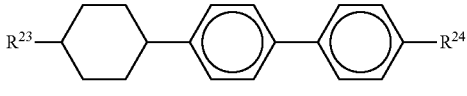
(II-I)

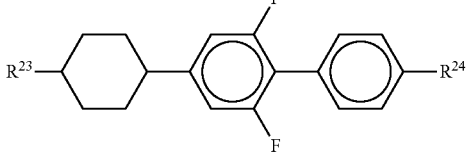
(II-J)

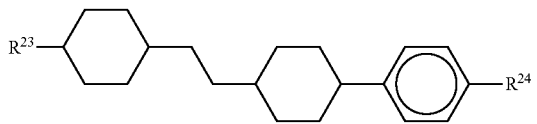

(II-K)

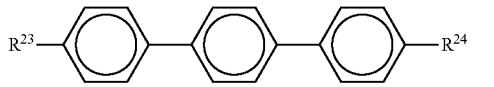

(II-L)

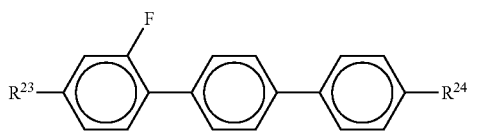

(II-M)

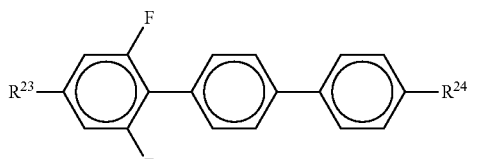

(II-N)

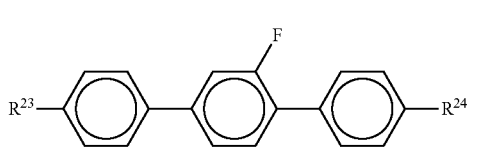

(II-O)

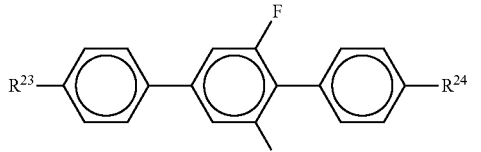

(II-P)

(In the formulae, $R^{23}$ and $R^{24}$ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms.)

$R^{23}$ and $R^{24}$ each independently preferably represent an alkyl group having 1 to 10 carbon atoms, an alkoxy group having 1 to 10 carbon atoms, or an alkenyl group having 2 to 10 carbon atoms and more preferably an alkyl group having 1 to 5 carbon atoms or an alkoxy group having 1 to 10 carbon atoms.

Among the compounds represented by the general formulae (II-A) to (II-P), she compounds represented by the general formulae (II-A), (II-B), (II-C), (II-E), (II-H), (II-I), (II-I), and (II-K) are preferred; and the compounds represented by the general formulae (II-A), (II-C), (II-E), (II-H), and (II-I) are further preferred.

In the present invention, one or more compounds represented by the general formula (II) are contained, 1 to 10 of the compounds are preferably contained, and 2 to 8 of the compounds are particularly preferably contained. The lower limit of the content of the compounds represented by the general formula (II) is preferably 5% by mass, more preferably 10% by mass, further preferably 20% by mass, and particularly preferably 30% by mass. The upper limit of the content is preferably 80% by mass, more preferably 70% by mass, and further preferably 60% by mass.

In the compounds represented by the general formulae (IIIa), (IIIb), and (IIIc) and used as third components, $R^{31}$, $R^{32}$, and $R^{33}$ each independently preferably represent an alkyl group having 1 to 10 carbon atoms or an alkenyl group having 2 to 10 carbon atoms, or a linear alkyl group having 1 to 15 carbon atoms or an alkenyl group having 2 to 15 carbon atoms (a methylene group or two or more methylene groups that are not adjacent to each other in these groups may be substituted wish —O— or —S—, and at least one hydrogen atom in these groups may be substituted with a fluorine atom or a chlorine atom); more preferably a linear alkyl group having 1 to 10 carbon atoms, a linear alkoxy group having 1 to 10 carbon atoms, or an alkenyl group having 2 to 10 carbon atoms; and particularly preferably a linear alkyl group having 1 to 8 carbon atoms or an alkoxy group having 1 to 3 carbon atoms.

$M^{31}$, $M^{32}$, $M^{33}$, $M^{34}$, $M^{35}$, $M^{36}$, $M^{37}$, and $M^{38}$ each independently preferably represent a trans-1,4-cyclohexylene group is methylene group or two or more methylene groups that are not adjacent to each other in this group may be substituted with —O— or —S—), a 1,4-phenylene group (one —CH= or two or more —CH= that are not adjacent to each other in this group may be substituted with a nitrogen atom), a 1,4-cyclohexenylene group, a 1,4-bicyclo(2,2,2)octylene group, a piperidine-1,4-diyl group, a naphthalene-2,6-diyl group, a 1,2,3,4-tetrahydronaphthalene-2,6-diyl group, or a decahydronaphthalene-2,6-diyl group (a hydrogen atom in these groups may be substituted with a cyano group, a fluorine atom, a trifluoromethyl group, a trifluoromethoxy group, or a chlorine atom); more preferably a trans-1,4-cyclohexylene group, a 1,4-phenylene group, a 3-fluoro-1,4-phenylene group, or a 3,5-difluoro-1,4-phenylene group; further preferably a trans-1,4-cyolohexylene group or a 1,4-phenylene group; and particularly preferably a trans-1,4-cyclohexylene group.

$L^{31}$, $L^{32}$, $L^{33}$, $L^{34}$, $L^{35}$, $L^{36}$, $L^{37}$, and $L^{38}$ each independently preferably represent a single bond, —OCO—, —COO—, —CH$_2$CH$_2$—, —(CH$_2$)$_4$—, —OCH$_2$—, —CH$_2$O—, —OCF$_2$—, —CF$_2$O—, or —C≡≡C—; more preferably a single bond, —CH$_2$CH$_2$—, —(CH$_2$)$_4$—, or —C≡C—; and particularly preferably a single bond or —CH$_2$CH$_2$—. $X^{31}$, $X^{32}$, $X^{33}$, $X^{34}$, $X^{35}$, $X^{36}$, and $X^{37}$ each independently represent a hydrogen atom or a fluorine atom. $Y^{31}$, $Y^{32}$, and $Y^{33}$ each independently preferably represent a hydrogen atom, a fluorine atom, a chlorine atom, a cyano group, a thiocyanate group, a trifluoromethoxy group, a trifluoromethyl group, a 2,2,2-trifluoroethyl group, a difluoromethoxy group, or an alkyl group having 1 to 12 carbon atoms; more preferably a hydrogen atom, a fluorine atom, a chlorine atom, a cyano group, a trifluoromethoxy group, a trifluoromethyl group, a 2,2,2-trifluoroethyl group, or an alkyl group having 1 to 12 carbon atoms; particularly preferably a fluorine atom. Furthermore, p, g, r, s, and t each independently represent 0, 1, or 2, where q+r and s+t are each 2 or less.

Specifically, the compound represented by the general formula (IIIa) preferably has the following structure represented by general formula (IIIa-1).

[Chem. 13]

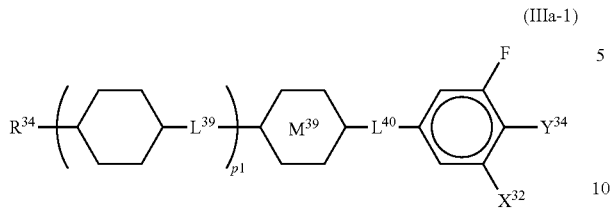
(IIIa-1)

(In the formula, $R^{34}$ represents an alkyl group having 1 to 8 carbon atoms, an alkoxyl group having 1 to 8 carbon atoms, or an alkenyl group having 2 to 8 carbon atoms; $L^{39}$ and $L^{40}$ each independently represent a single bond, —CH$_2$CH, —(CH$_2$)$_4$—, —OCH$_2$—, —CH$_2$O—, —OCF$_2$—, —CF$_2$O—, or —C≡C—; $M^{39}$ represents a 1,4-phenylene group or a trans-1,4-cyclohexylene group; $X^{32}$ represents a hydrogen atom or a fluorine atom; $p_1$ represents 0 or 1; and $Y^{34}$ represents a cyano group, a fluorine atom, a chlorine atom, a trifluoromethyl group, a fluoromethoxy group, a difluoromethoxy group, or a trifluoromethoxy group.)

More specifically, the compound represented by the general formula (IIIa-2a) preferably has the following structures represented by general formulae (IIIa-2a) to (IIIa-4d).

[Chem. 14]

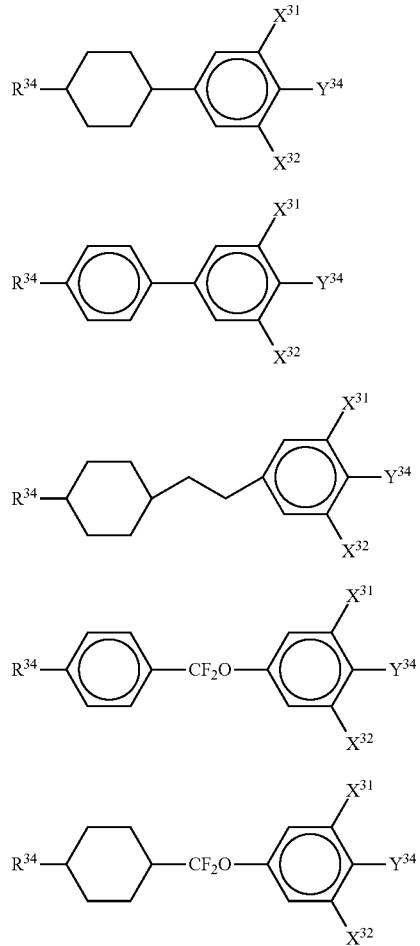

[Chem. 15]

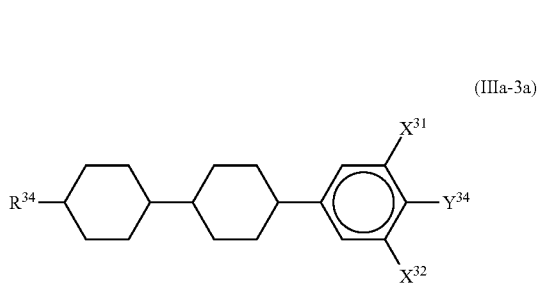

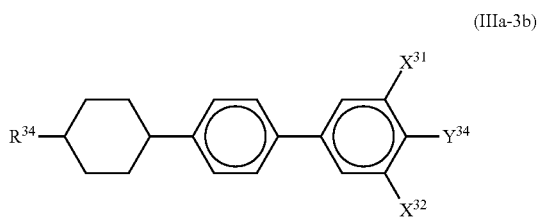

(IIIa-3h)

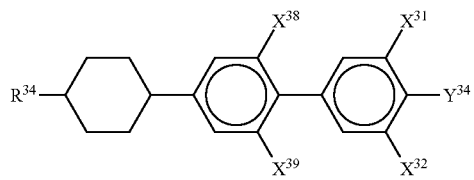

(IIIa-3i)

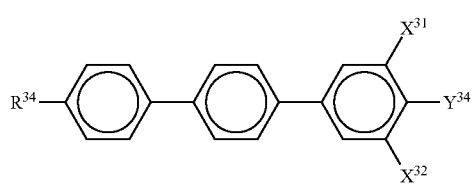

(IIIa-3j)

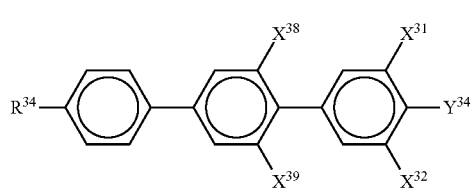

[Chem. 16]

(IIIa-4a)

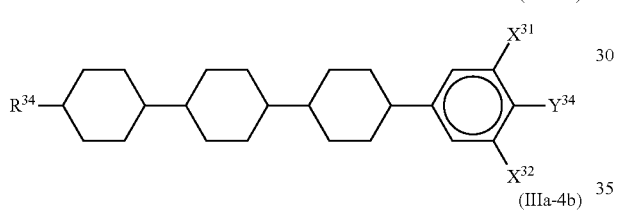

(IIIa-4b)

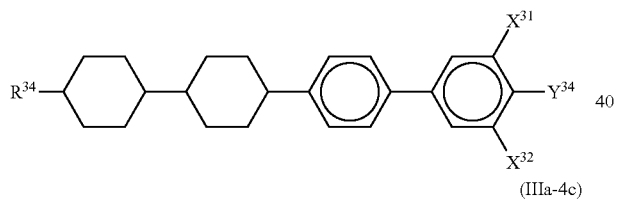

(IIIa-4c)

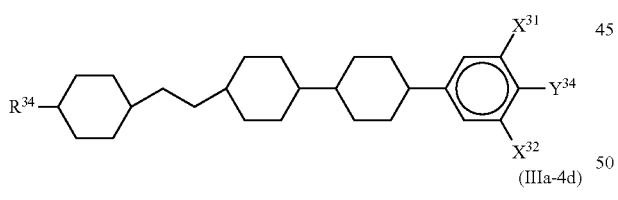

(IIIa-4d)

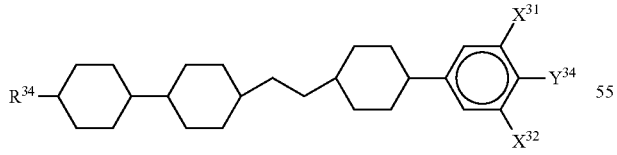

(In the formulae, $R^{34}$ represents an alkyl group having 1 to 8 carbon atoms, an alkoxyl group having 1 to 8 carbon atoms, or an alkenyl group having 2 to 8 carbon atoms; $X^{31}$ and $X^{32}$ each independently represent a hydrogen atom or a fluorine atom; and $Y^{34}$ represents a cyano group, a fluorine atom, a chlorine atom, a trifluoromethyl group, a fluoromethoxy group, a difluoromethoxy group, or a trifluoromethoxy group.)

The compound represented by the general formula (IIIa) also preferably has the following structures.

[Chem. 17]

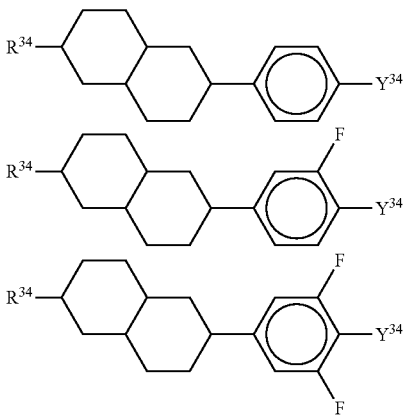

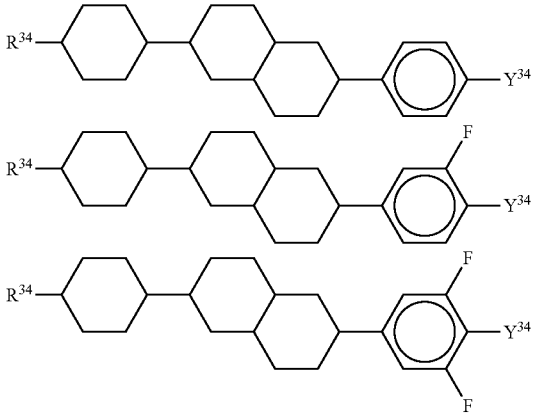

(In the formulae, $R^{34}$ represents an alkyl group having 1 to 8 carbon atoms, an alkoxyl group having 1 to 8 carbon atoms, or an alkenyl group having 2 to 8 carbon atoms; and $Y^{34}$ represents a cyano group, a fluorine atom, a chlorine atom, a trifluoromethyl group, a fluoromethoxy group, a difluoromethoxy group, or a trifluoromethoxy group.)

The compound represented by the general formula (IIIb) preferably has the following structures represented by general formulae below.

[Chem. 18]

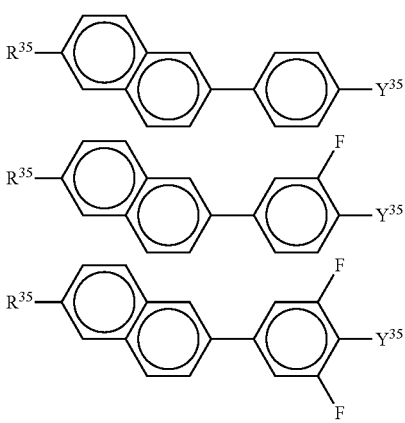

-continued
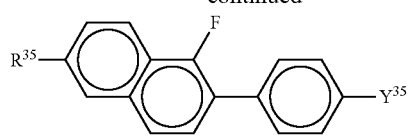
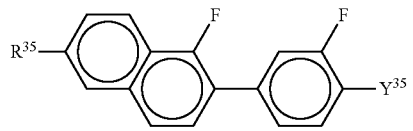
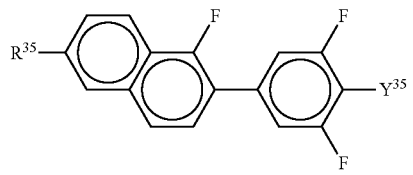
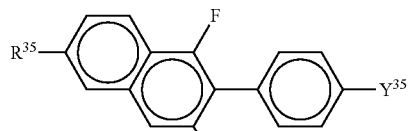
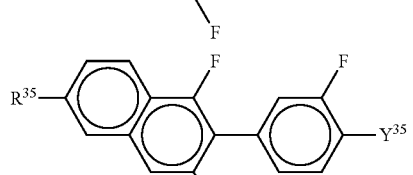
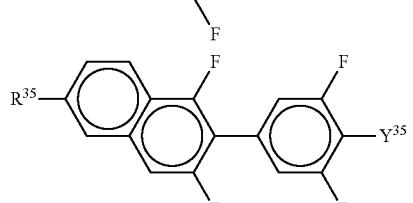
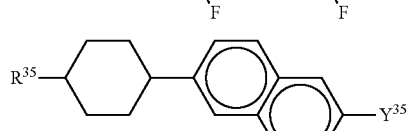
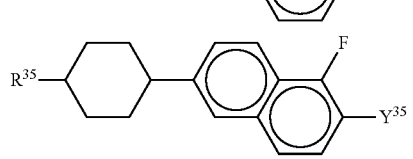
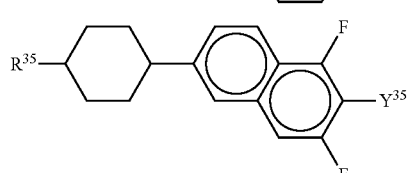
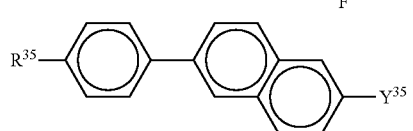
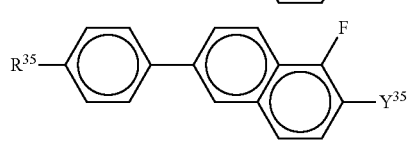
-continued
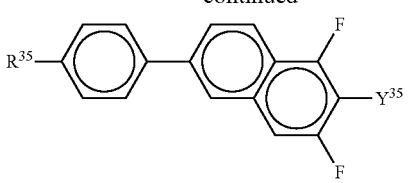
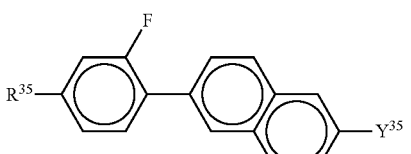
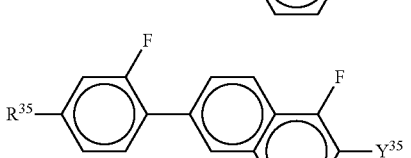
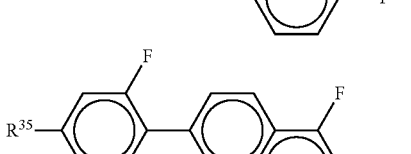
[Chem. 19]
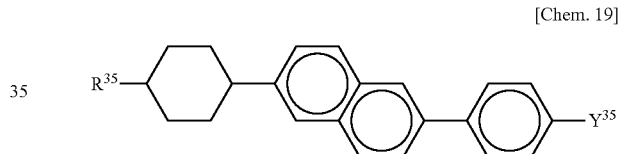
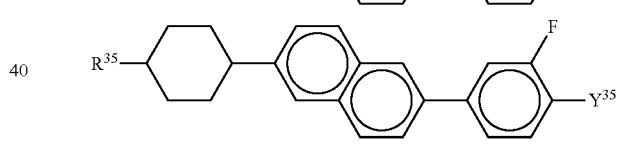
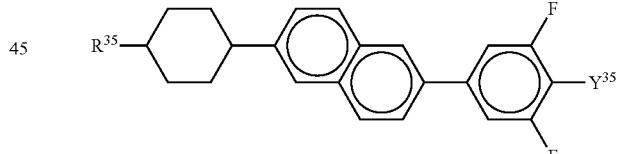
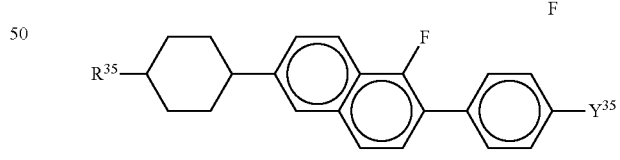
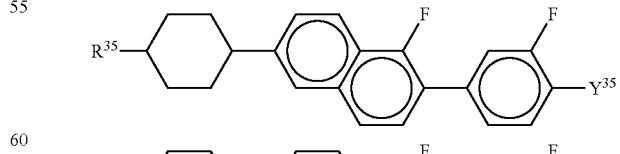
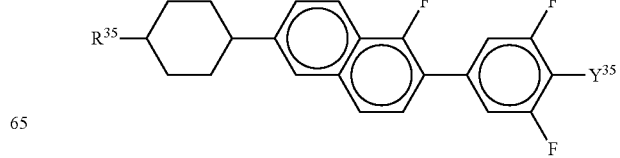

-continued

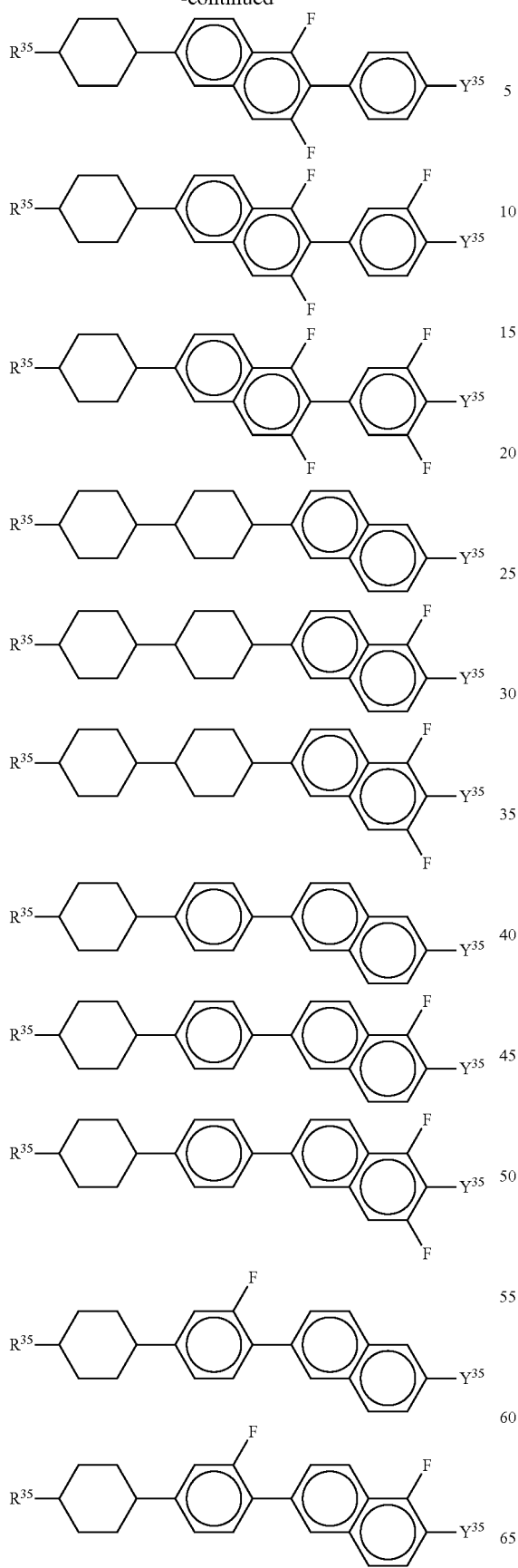

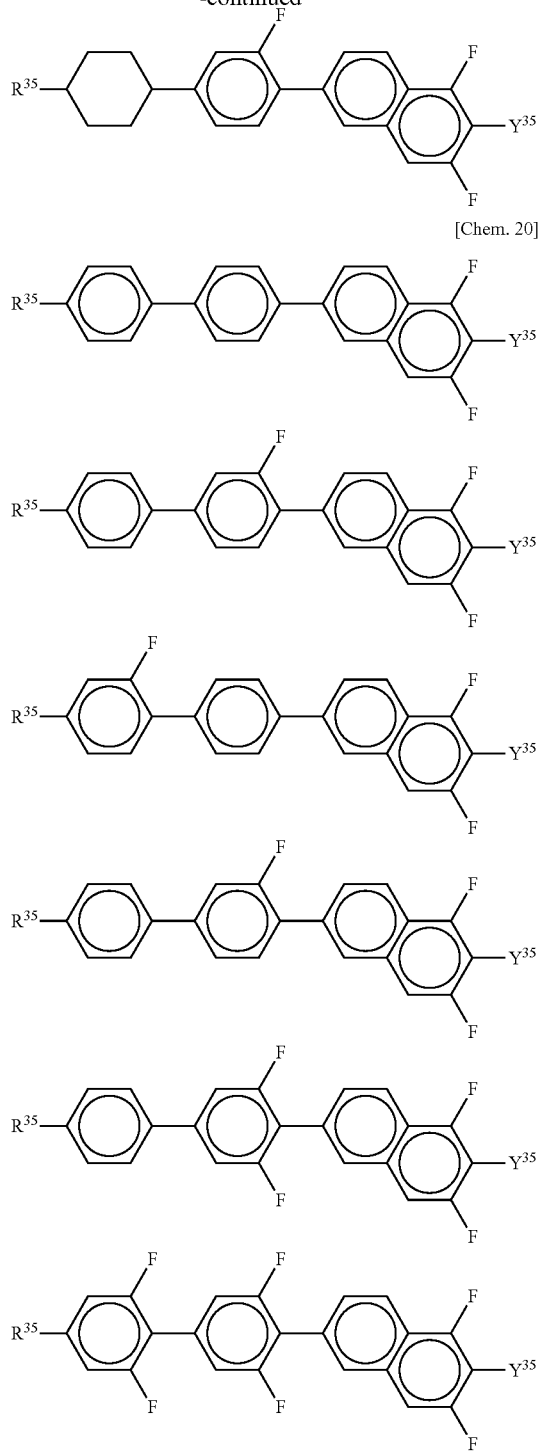

(In the formulae, $R^{35}$ represents an alkyl group having 1 to 8 carbon atoms, an alkoxyl croup having 1 to 8 carbon atoms, or an alkenyl group having 2 to 8 carbon atoms; and $Y^{35}$ represents a cyano group, a fluorine atom, a chlorine atom, a trifluoromethyl group, a fluoromethoxy group, a difluoromethoxy group, or a trifluoromethoxy group.)

The compound represented by the general formula (IIIc) preferably has the following structures represented by general formulae below.

[Chem. 21]
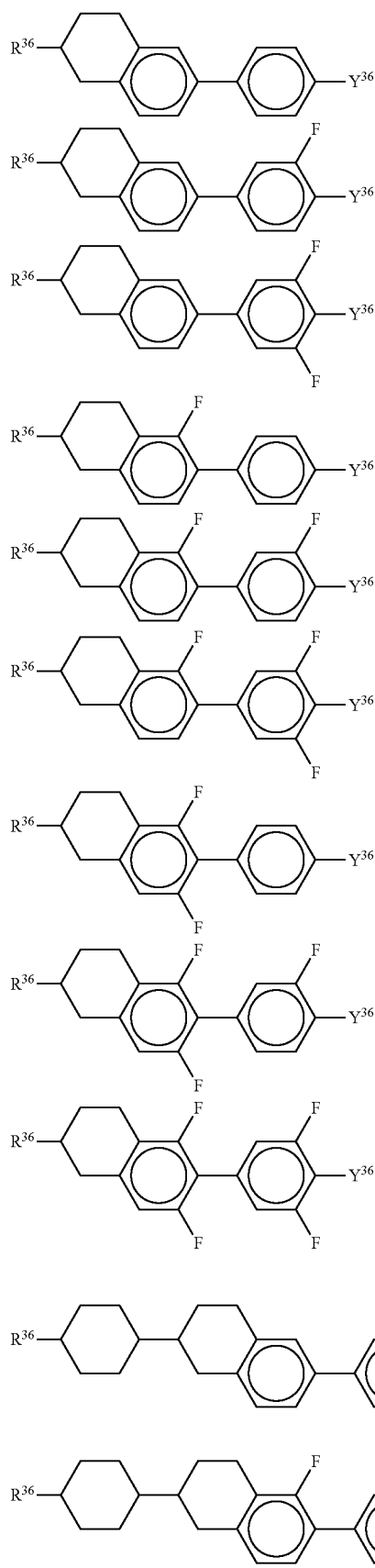
[Chem. 22]
[Chem. 23]
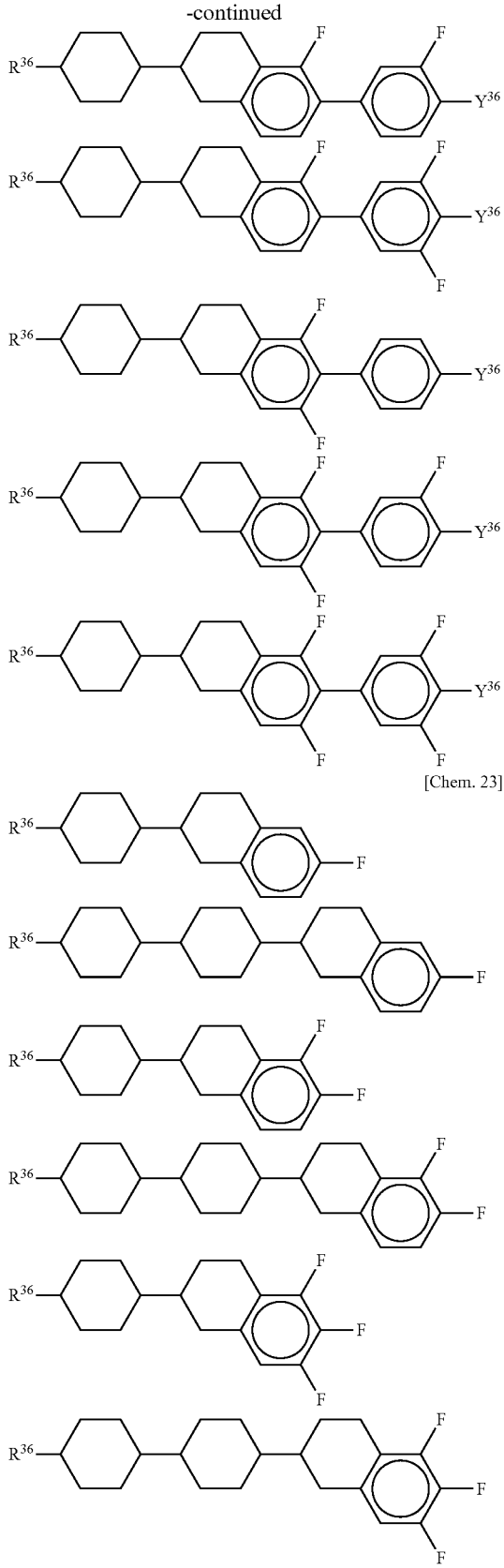
-continued
(In the formulae, $R^{36}$ represents an alkyl group having 1 to 8 carbon atoms, an alkoxyl group having 1 to 8 carbon atoms, or an alkenyl group having 2 to 8 carbon atoms; and $Y^{36}$ represents a cyano group, a fluorine atom, a chlorine atom, a trifluoromethyl group, a fluoromethoxy group, a difluoromethoxy group, or a trifluoromethoxy group.) One or more compounds selected from the group consisting of the compounds represented by the general formulae (IIIa), (IIIb), and (IIIc) are contained, 1 to 10 of the compounds are preferably contained, and 2 to 8 of the compounds are particularly preferably contained. The lower limit of the content of the compounds represented by the general formulae (IIIb), and (IIIc) is preferably 5% by mass, more preferably 10% by mass, and further preferably 20% by mass. The upper limit of the content is preferably 80% by mass, more preferably 70% by mass, further preferably 60% by mass, and particularly preferably 50% by mass.

In the compounds represented by the general formulae (IVa), (IVb), and (IVc), $R^{41}$, $R^{42}$, $R^{43}$, $R^{44}$, $R^{45}$, and $R^{46}$ each independently preferably represent, an alkyl group having 1 to 10 carbon atoms or an alkenyl group having 2 to 10 carbon atoms, or a linear alkyl group having 1 to 15 carbon atoms or an alkenyl group having 2 to 15 carbon atoms (a methylene group or two or more methylene groups that are not adjacent to each other in these groups may be substituted with —O— or —S—, and at least one hydrogen atom in these groups may be substituted with a fluorine atom or a chlorine atom); more preferably a linear alkyl group having 1 to 10 carbon atoms, a linear alkoxy group having 1 to 10 carbon atoms, or an alkenyl group having 2 to 10 carbon atoms; and particularly preferably a linear alkyl group having 1 to 8 carbon atoms or an alkoxy group having 1 to 8 carbon atoms. $M^{41}$, $M^{42}$, $M^{43}$, $M^{44}$, $M^{45}$, $M^{46}$, $M^{47}$, $M^{48}$, and $M^{49}$ each independently preferably represent a trans-1,4-cyclohexylene group (a methylene group or two or more methylene groups that are not adjacent to each other in this group may be substituted with —O— or —S—) a 1,4-phenylene group (one —CH= or two or more —CH= that are not adjacent no each other in this group may be substituted with a nitrogen atom), a 1,4-cyclohexenylene group, a 1,4-bicyclo(2,2,2)octylene group, a piperidine-2,5-diyl group, a naphthalene-2,6-diyl group, a 1,2,3,4-tetrahydronaphthalene-2,6-diyl group, or a decahydronaphthalene-2,6-diyl group (a hydrogen acorn in these groups may be substituted with a cyano group, a fluorine atom, a trifluoromethyl group, trifluoromethoxy group, or a chlorine atom); more preferably a trans-1,4-cyclohexylene group, a 1,4-phenylene group, a 3-fluoro-1,4-phenylene group, or a 2,3-difluoro-1,4-phenylene group; further preferably a trans-1,4-cyclohexylene group or a 1,4-phenylene group; and particularly preferably a trans-1,4-cyclohexylene group. $L^{41}$, $L^{42}$, $L^{44}$, $L^{45}$, $L^{46}$, $L^{47}$, $L^{48}$, and $L^{49}$ each independently preferably represent a single bond, —CH$_2$CH$_2$—, (CH$_2$)$_4$—, —OCO—, —COO—, —OCH$_2$—, —CH$_2$O—, —OCF$_2$—, —CF$_2$O—, or —C≡C—; and more preferably a single bond, —CH$_2$CH$_2$—, —OCH$_2$—, or —CH$_2$O—. $X^{41}$, $X^{42}$, $X^{43}$, $X^{44}$, $X^{45}$, $X^{46}$, and $X^{47}$ each independently represent a hydrogen atom or a fluorine atom; G represents a methylene group or —O—; u, v, w, x, y, and z each independently represent 0, 1, or 2, where u+v, w+x, and y+z are each 2 or less.

Specifically, the compound represented by the general formula (IVa) preferably has the following structure represented by general formula (IVa-1).

[Chem. 24]

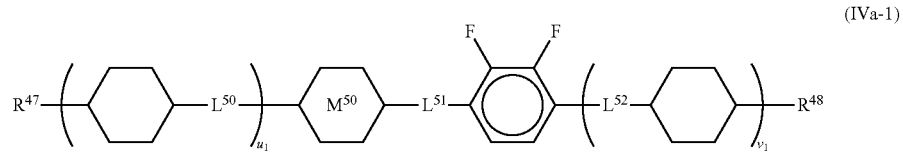

(IVa-1)

(In the formula, $R^{47}$ and $R^{48}$ each independently represent an alkyl group having 1 to 8 carbon atoms, an alkoxyl group having 1 to 8 carbon atoms, or an alkenyl group having 2 to 8 carbon atoms; $L^{50}$, $L^{51}$, and $L^{52}$ independently represent a single bond, —CH$_2$CH$_2$—, —(CH$_2$)$_4$—, —OCH—, —CH$_2$O—, —OCF$_2$—, —CF$_2$O—, or —C≡C—; $M^{50}$ represents a 1,4-phenylene group or a trans-1,4-cyclohexylene group; and $u_1$ and $v_1$ each independently represent 0 or 1.)

More specifically, the compound represented by the general formula (IVa) preferably has the following structures represented by general formulae (IVa-2a) to (IVa-3i).

[Chem. 25]

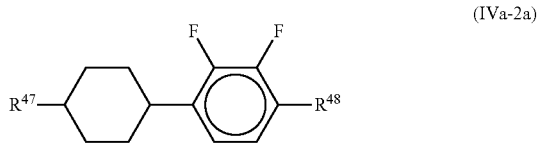

(IVa-2a)

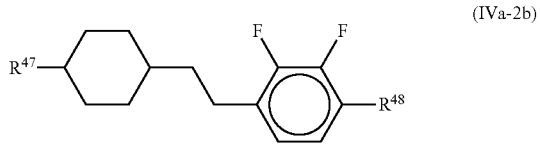

(IVa-2b)

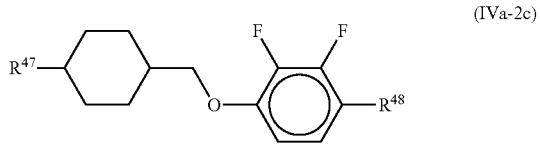

(IVa-2c)

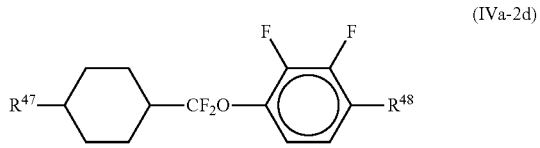

(IVa-2d)

[Chem. 26]

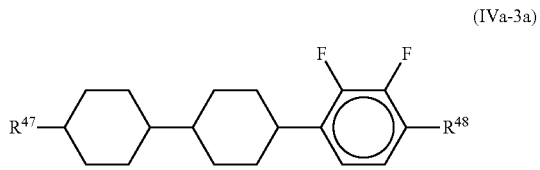

(IVa-3a)

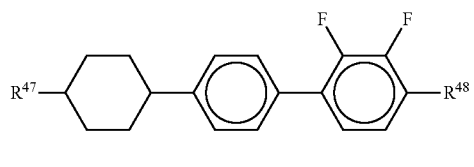
(IVa-3b)

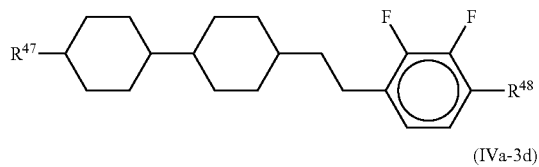
(IVa-3c)

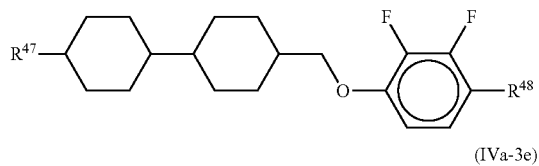
(IVa-3d)

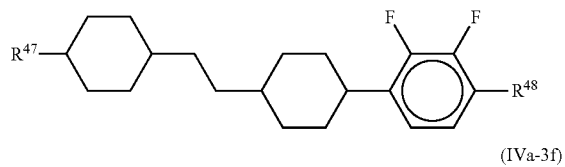
(IVa-3e)

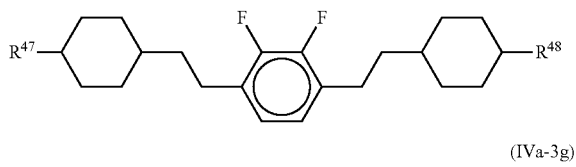
(IVa-3f)

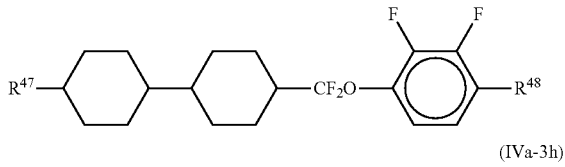
(IVa-3g)

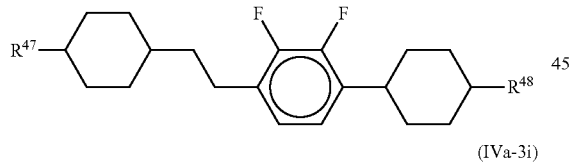
(IVa-3h)

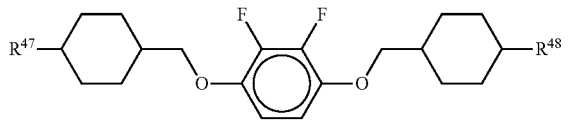
(IVa-3i)

(In the formulae, $R^{47}$ and $R^{48}$ each independently represent an alkyl group having 1 to 8 carbon atoms, an alkoxyl group having 1 to 8 carbon atoms, or an alkenyl group having 2 to 8 carbon atoms.) The compound represented by the general formula (IVa) more preferably has a structure in which $R^{47}$ and $R^{48}$ each independently represent an alkyl group having 1 to 8 carbon atoms or an alkenyl group hating 1 to 8 carbon atoms.

Specifically, the compound represented by the general formula (IVb) preferably has the following structure represented by general formula (IVb-1) below.

[Chem. 27]

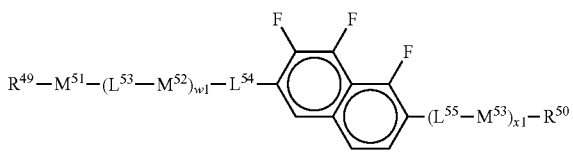
(IVb-1)

(In the formula, $R^{49}$ and $R^{50}$ each independently represent an alkyl group having 1 to 8 carbon atoms, an alkoxyl group having 1 to 8 carbon atoms, or an alkenyl group having 2 to 8 carbon atoms; $L^{53}$, $L^{54}$, and $L^{55}$ each independently represent a single bond, —$CH_2CH_2$—, —$(CH_2)_4$—, —$OCH_2$—, —$CH_2O$—, —$OCF_2$—, —$CF_2O$—, or —C≡C—; and $M^{51}$, $M^{52}$, and $M^{53}$ each represent a 1,4-phenylene group or a trans-1,4-cyclohexylene group; and w1 and x1 each independently represent 0, 1, or 2, where w1+x1 is 2 or less.)

More specifically, the compound represented by the general formula (IVb) preferably has the following structures represented by general formulae (IVb-2a) to (IVb-31).

[Chem. 28]

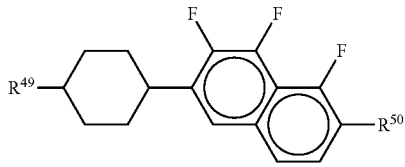
(IVb-2a)

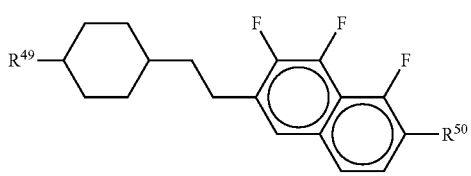
(IVb-2b)

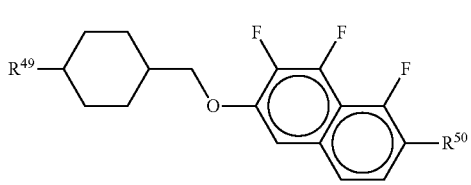
(IVb-2c)

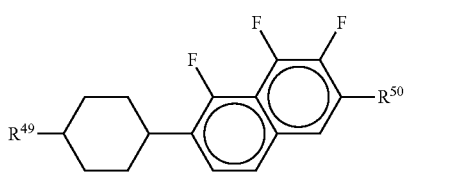
(IVb-2d)

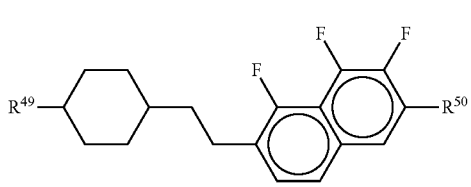
(IVb-2e)

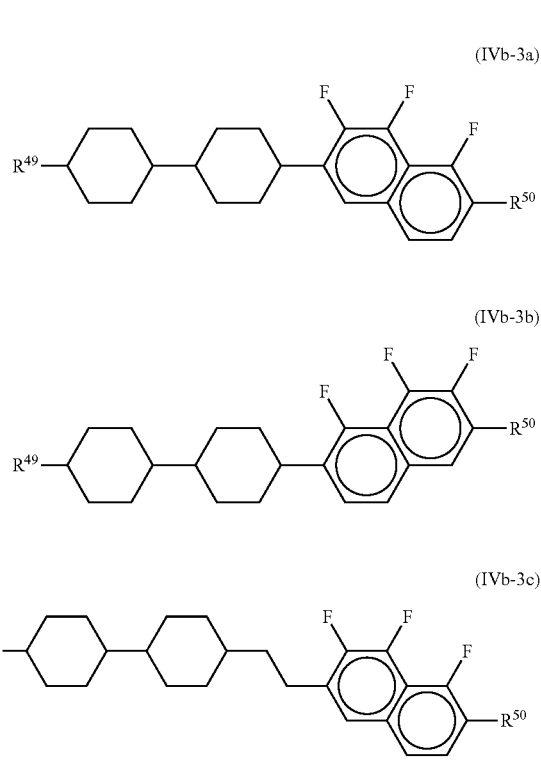

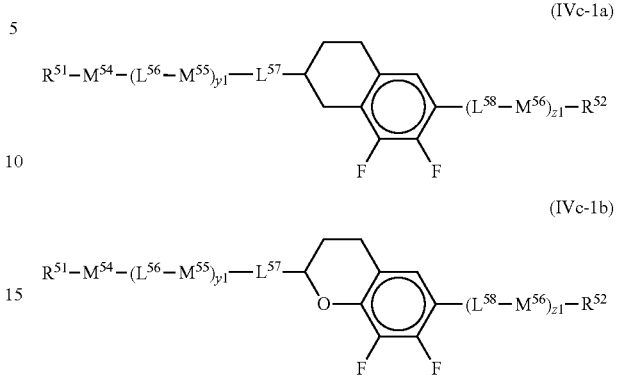

(In the formulae, $R^{49}$ and $R^{50}$ each independently represent an alkyl group having 1 to 8 carbon atoms, an alkoxyl group having 1 to 8 carbon atoms, or an alkenyl group having 2 to 8 carbon atoms.)

Specifically, the compound represented by the general formula (IVc) preferably has the following structures represented by general formulae (IVc-1a) and (IVc-1b) below.

(In the formulae, $R^2$ and $R^{52}$ each independently represent an alkyl group having 1 to 8 carbon atoms, an alkenyl group having 1 to 8 carbon atoms, or an alkenyl group having 2 to 8 carbon atoms; $L^{56}$, $L^{57}$, and $L^{58}$ each independently represent a single bond, —$CH_2CH_2$—, —$(CH_2)_4$—, —$OCH_2$—, —$CH_2O$—, —$OCF_2$—, —$CF_2O$—, or —$C\equiv C$—; $M^{54}$, $M^{55}$, and $M^{56}$ each represent a 1,4-phenylene group or a trans-1,4-cyclohexylene group; and y1 and z1 each independently represent 0, 1, or 2, where y1+z1 is 2 or less.)

More specifically, the following structures represented by general formulae (IVc-2a) to (IVc-2g) below are also preferable.

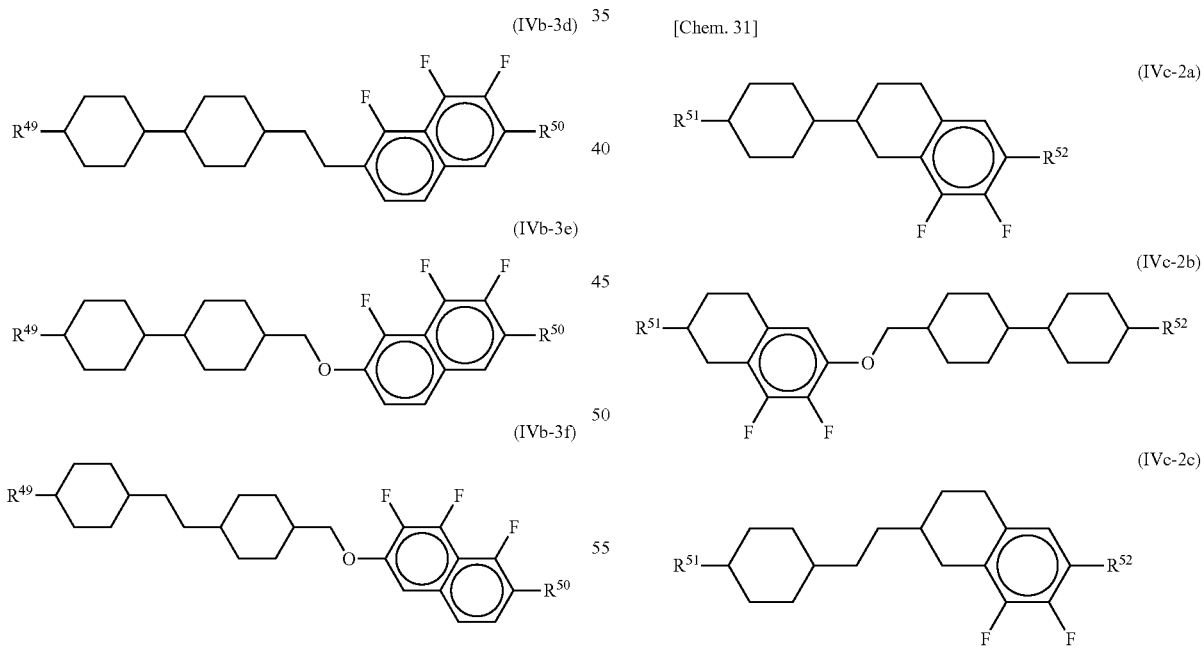

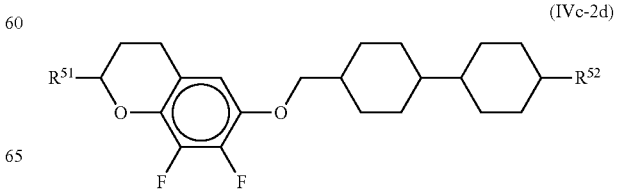

-continued

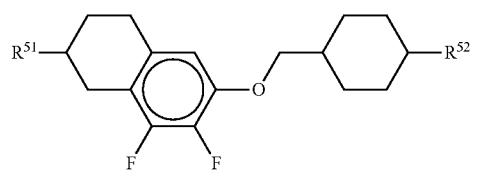

(IVc-2e)

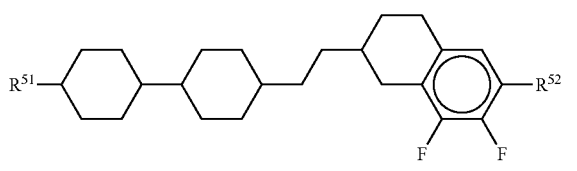

(IVc-2f)

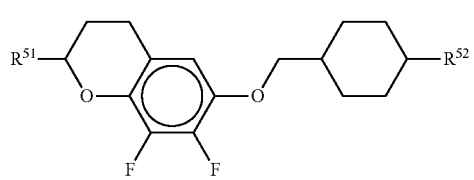

(IVc-2g)

(In the formulae, $R^{51}$ and $R^{52}$ each independently represent an alkyl group having 1 to 8 carbon atoms, an alkoxyl group having 1 to 8 carbon atoms, or an alkenyl group having 2 to 8 carbon atoms.)

One or more compounds selected from the group consisting of the compounds used as third components and represented by the general formulae (IIIa), (IIIb), and (IIIc) or selected from the group consisting of the compounds represented by the general formulae (IVa), (IVb), and (IVc) are contained, 2 to 10 of the compounds are preferably contained, and 2 to 8 of the compounds are particularly preferably contained. The lower limit of the content of the compounds is preferably 5% by mass, more preferably 10% by mass, and further preferably 20% by mass. The upper limit of the content is preferably 80% by mass, more preferably 70% by mass, further preferably 60% by mass, and particularly preferably 50% by mass.

In the liquid crystal composition of the present invention, $\Delta n$ is preferably 0.08 to 0.25.

In the liquid crystal composition of the present invention, a liquid crystal composition having positive or negative $\Delta\varepsilon$ can be used depending on the display mode of the liquid crystal display element. In liquid crystal display elements with an MVA mode, a liquid crystal composition having negative $\Delta\varepsilon$ is used. In this case, $\Delta\varepsilon$ is preferably −1 or less and more preferably −2 or less.

The liquid crystal composition of the present invention has a wide liquid crystal phase temperature range (the absolute value of a difference between the liquid crystal phase lower limit temperature and the liquid crystal phase upper limit temperature), and the liquid crystal phase temperature range is preferably 100° C. or more and more preferably 120° C. or more. The liquid crystal phase upper limit temperature is preferably 70° C. or more and more preferably 80° C. or more. The liquid crystal phase lower limit temperature is preferably −20° C. or less and more preferably −30° C. or less.

The liquid crystal composition of the present invention may contain a typical nematic liquid crystal, smectic liquid crystal, cholesteric liquid crystal, or the like, in addition to the above-described compounds.

The polymerization of the liquid crystal composition containing a polymerizable compound according to the present invention proceeds even if a polymerization initiator is not present. However, the liquid crystal composition may contain a polymerization initiator to facilitate polymerization. Examples of the polymerization initiator include benzoin ethers, benzophenones, acetophenones, benzyl ketals, and acylphosphine oxides.

To improve the storage stability, the liquid crystal composition of the present invention may contain a stabilizer. Examples of the stabilizer that can be used include hydroquinones, hydroquinone monoalkyl ethers, tertiary butyl catechols, pyrogallols, thiophenols, nitro compounds, β-naphthylamines, β-naphthols, and nitroso compounds. If the stabilizer is used, the content is preferably 0.005 to 1%: by mass, more preferably 0.02 to 0.5% by mass, and particularly preferably 0.03 to 0.1% by mass relative to the liquid crystal composition.

To the liquid crystal composition of the present invention, a liquid crystal alignment capability is provided by polymerization of the polymerizable compound contained in the liquid crystal composition. The liquid crystal composition is used in a liquid crystal display element in which the amount of transmitted light is controlled by using the birefringence of the liquid crystal composition. The liquid crystal composition is useful for liquid crystal display elements, such as an AM-LCD (active-matrix liquid crystal display element), a TN (nematic liquid crystal display element), an STN-LCD (super twisted nematic liquid crystal display element), an OCB-LCD, and an IPS-LCD (in-plane-switching liquid crystal display element). The liquid crystal composition is particularly useful for an AM-LCD, and can be used in a transmissive or reflective liquid crystal display element.

Two substrates of a liquid crystal cell used in a liquid crystal display element may be composed of glass or a flexible transparent material such as a plastic material. One of the substrates may be composed of an opaque material such as silicon. A transparent substrate having a transparent electrode layer an be produced by, for example, sputtering indium tin oxide (ITO) onto a transparent substrate such as a glass plate.

A color filter can be produced by, for example, pigment dispersion method, a printing method, an electrodeposition method, or a staining method. For example, a method for producing a color filter by a pigment dispersion method will be described. A curable coloring composition for a color filter is applied onto the above-mentioned transparent substrate, and is then patterned. The curable coloring composition is then cured by heating or light irradiation. These steps are performed for each of three colors of red, green, and blue. Thus, pixel portions for the color filter can be formed. Furthermore, pixel electrodes each including an active element such as a TFT, a thin-film diode, or a metal-insulator-metal specific resistance element may be provided on the substrate.

The substrates are arranged so as to face each other such that the transparent electrode layer is disposed inside. In this step, the gap between the substrates may be adjusted by providing a spacer therebetween. In this case, the gap is preferably adjusted so that the thickness of a light-modulating layer obtained is in the range of 1 to 100 μm, and more preferably 1.5 to 10 μm. When a polarizing plate is used, the product of the optical anisotropy Δn of liquid crystals and a cell thickness d is preferably adjusted so that the maximum contrast is achieved. When two polarizing plates are provided, the adjustment may also be performed so that a satisfactory angle of view and contrast can be achieved by adjusting the polarizing axis of each of the polarizing plates.

Furthermore, a retardation film for widening the angle of view may also be used. Examples of the spacer include glass particles, plastic particles, alumina particles, and photoresist materials. Subsequently, a sealant composed of an epoxy thermosetting composition or the like is applied onto the substrate by screen printing with a liquid-crystal injection port formed in the sealant. The substrates are then bonded to each other, and the sealant is thermally cured by heating.

A polymer-stabilized liquid crystal composition can be interposed between the two substrates by a typical vacuum injection method, ODF method, or the like.

Since rapid progress of polymerization is desirable, the polymerizable compound is preferably polymerized by applying an active energy ray such as ultraviolet light or an electron beam. In the case where ultraviolet light is used, either a polarized light source or an unpolarized light source may be used. When polymerization is performed in a state in which the liquid crystal composition is interposed between two substrates, at least a substrate on the irradiation surface side needs to have transparency appropriate for the active energy ray. Alternatively, only specific portions may be polymerized using a mask during light irradiation, and then unpolymerized portions may be polymerized by further applying an active energy ray while changing the alignment state of the unpolymerized portions by changing a condition such as electric field, magnetic field, or temperature. In particular, when ultraviolet exposure is performed, the ultraviolet exposure is preferably performed while applying an alternating current to the liquid crystal composition. The alternating current applied preferably has a frequency of 500 Hz to 10 kHz and more preferably 1 kHz to 10 kHz.

The temperature during the irradiation is preferably within a temperature range in which the liquid crystal state of the liquid crystal composition of the present invention is maintained. Polymerization is preferably performed at a temperature close to room temperature, that is, typically at a temperature of 1.5 to 35° C. A metal halide lamp, a high-pressure mercury lamp, an ultrahigh-pressure mercury lamp, or the like can be used as a lamp for generating ultraviolet light. Regarding the wavelength of ultraviolet light irradiated, it is preferable to perform irradiation with ultraviolet light in a wavelength range other than an absorption wavelength range of the liquid crystal composition. It is preferable that a particular wavelength range of ultraviolet light be cut off as required, and the remaining ultraviolet wavelength range be used. The intensity of ultraviolet light irradiated is preferably 0.1 mW/cm$^2$ to 50 W/cm$^2$ and more preferably 2 mW/cm$^2$ to 20 W/cm$^2$. The amount of energy of the ultraviolet light irradiated can be appropriately adjusted, and is preferably 10 to 10000 mJ/cm$^2$ and more preferably 100 to 7000 mJ/cm$^2$. During the irradiation with ultraviolet light, the intensity of the ultraviolet light may be changed. The ultraviolet-irradiation time is appropriately selected in accordance with the intensity of the ultraviolet light irradiated, and is preferably 10 to 600 seconds.

EXAMPLES

The present invention will now be further described in detail based on Examples, but is not limited to Examples. In the following compositions of Examples and comparative Examples, "1" means "% by mass".

Physical properties of liquid crystal compositions are shown as follows.

$T_{N-1}$: Liquid crystal phase upper limit temperature, which is nematic phase-isotropic liquid phase transition temperature (° C.)

$\Delta\varepsilon$: Dielectric anisotropy $\Delta n$: Optical anisotropy

Vth: Applied voltage (threshold voltage) at which the transmittance is changed by 10% when a square wave with a frequency of 1 kHz is applied (Method for Measuring Amount of Residual Monomer after UV Curing)

A liquid crystal composition was injected into a liquid crystal cell, and the cell was then irradiated with UV light to polymerize a polymerizable compound. Subsequently, the liquid crystal cell, was disassembled, and an acetonitrile solution of an elution component containing a liquid crystal material, a polymerized product, and an unpolymerized polymerizable compound was prepared. This solution was analyzed by high-performance liquid chromatography (column:developing solvent:acetonitrile) to measure the peak area of each component. The amount of residual polymerizable compound was determined from the ratio of the peak area of the unpolymerized polymerizable compound to the peak area of a liquid crystal material used as an indicator. The amount of residual monomer was determined from this value and the amount of polymerizable compound initially added. The detection limit of the amount of residual polymerizable compound was 1000 ppm.

Example 1

A liquid crystal composition LC-1 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The compounds constituting the liquid crystal composition LC-1 and the proportions of the compounds are shown as follows.

[Chem. 32]

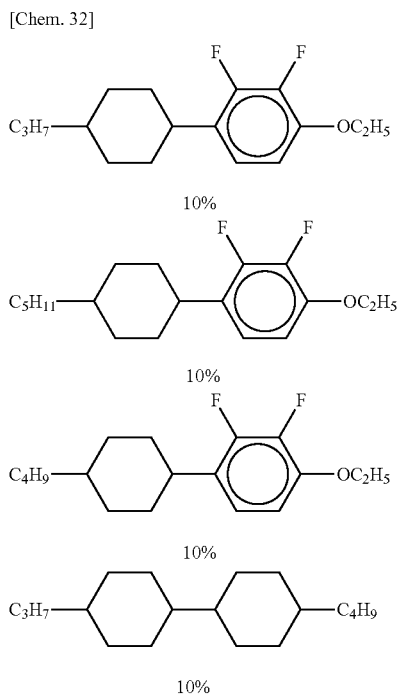

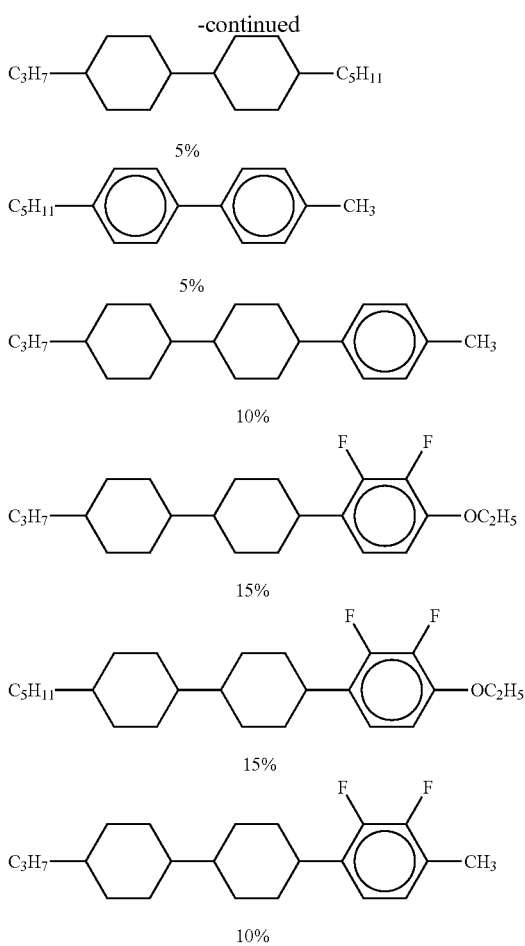

Table 1 shows the physical properties of the liquid crystal composition LC-1.

TABLE 1

| | |
|---|---|
| $T_{N-I}$(° C.) | 80 |
| Δε | −3.5 |
| Δn | 0.087 |

A polymerizable liquid crystal composition CLC-1 was prepared by adding 0.3% of a polymerizable compound represented by the general formula (I-1) to 99.7% of the liquid crystal composition LC-1 and uniformly dissolving the polymerizable compound. The physical properties of the CLC-1 were substantially the same as those of the LC-1. The CLC-1 was injected, by a vacuum injection method, into a cell with ITO, the cell having a cell gap of 3.5 μm and including polyimide alignment layers that induce a homeotropic alignment. The pretilt angle of this cell was measured (by a crystal rotation method), and then the liquid crystal cell, was irradiated with ultraviolet light using a high-pressure mercury lamp through a filter that cuts of ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. Table 2 shows the pretilt angles of the element measured before and after the ultraviolet irradiation and an electro-optic property of the element.

TABLE 2

| | |
|---|---|
| Pretilt angle before ultraviolet irradiation | 89.5 |
| Pretilt angle after ultraviolet irradiation | 87.5 |
| Vth (V) | 2.42 |

If was found from the above results of the pretilt angles that the polymerization of the polymerizable compound provided a homeotropic-alignment liquid crystal display element in which a pretilt was provided to liquid crystal molecules. The content of the compound represented by the general formula (I-1) in the element was analyzed by liquid chromatography, but the compound was not detected. Thus, it was confirmed that the polymerizable compound represented by the general formula (I-1) could be polymerized without using a polymerization initiator, and that the content of the unpolymerized material remaining after the polymerization was equal to or less than the detection limit.

Comparative Example 1

A polymerizable liquid crystal composition CLC-A was prepared by adding 0.3% of a polymerizable compound represented by general formula (A) to 99.7% of the liquid crystal composition LC-1 and uniformly dissolving the polymerizable compound.

[Chem. 33]

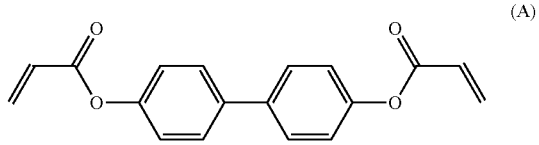

(A)

The CLC-A was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts of ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before the ultraviolet irradiation of the element was 89.6 degrees whereas the pretilt angle after the ultraviolet irradiation was 89.5 degrees, which means that a pretilt was not provided. From the results of liquid chromatography, the content of the compound represented by the general formula (A) in the element was the same as the content of the compound before the ultraviolet irradiation, which means that the polymerization of the polymerizable compound (A) did not proceed.

Example 2

A polymerizable liquid crystal composition CLC-2 was prepared by adding 0.3% of a polymerizable compound represented by the general formula (I-2) to 99.7% of the liquid crystal composition LC-1 and uniformly dissolving the polymerizable compound. The CLC-2 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell, was irradiated with ultraviolet light, using a high-pressure mercury lamp through a filter that cuts off ultraviolet light with a wavelength of 320 μm or less while a square wave of 1.8 V is applied at a frequency of 1 kHz. The irradiation was performed for 600 seconds while the irradiation intensity on the surface of the cell was adjusted to 10 mW/cm$^2$ to obtain a homeotropic-alignment liquid crystal display element in which the polymerizable compound in the polymerizable liquid crystal composition was polymerized. The pretilt angle before the ultraviolet irradiation of the element was 89.6 degrees whereas the pretilt angle after the ultraviolet irradiation was 87.4 degrees, which means that a pretilt was provided. The content of the compound represented by the general formula (I-2) in the element was analyzed by liquid chromatography, but the content was equal to or less than the detection limit. Thus, it was confirmed that the polymerizable compound represented by the general formula (I-2) could be polymerized without using a polymerization initiator, and that the content of the unpolymerized material remaining after the polymerization was equal to or less than the detection limit.

Example 3

A polymerizable liquid crystal composition CLC-3 was prepared by adding 0.3% of a polymerizable compound represented by the general formula (I-20) to 99.7% of the liquid crystal composition LC-1 and uniformly dissolving the polymerizable compound. The CLC-3 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm$^2$ to obtain a homeotropic-alignment liquid crystal display element in which the polymerizable compound in the polymerizable liquid crystal composition was polymerized. The pretilt angle before the ultraviolet irradiation of the element, was 89.5 degrees whereas the pretilt angle after the ultraviolet irradiation was 87.7 degrees, which means that a pretilt was provided. The content of the compound represented by the general formula (I-20) in the element was analyzed by liquid chromatography, but the content was equal to or less than the detection limit. Thus, it was confirmed that the polymerizable compound represented by the general formula (I-20) could be polymerized without using a polymerization initiator, and that the content of the unpolymerized material remaining after the polymerization was equal to or less than the detection limit.

Example 4

A polymerizable liquid crystal composition CLC-7 was prepared by adding 0.3% of a polymerizable compound represented by the general formula (I-36) to 99.7% of the liquid crystal composition LC-1 and uniformly dissolving the polymerizable compound. The CLC-7 was injected, by a vacuum injection method, into a cell with ITO, the cell having a cell gap of 3.5 μm and including polyimide alignment layers that induce a homeotropic alignment. The pretilt angle of this cell was measured, and then she liquid or cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 MW/cm$^2$ to obtain a homeotropic-alignment liquid crystal display element in which the polymerizable compound in the polymerizable liquid crystal composition was polymerized. The pretilt angle before the ultraviolet irradiation of the element was 89.5 degrees whereas the pretilt angle after the ultraviolet irradiation was 87.1 degrees, which means that a pretilt was provided. The content of the compound represented by the general formula (I-36) in the element was analyzed by liquid chromatography, but the content was equal to or less than the detection limit. Thus, it was confirmed that the polymerizable compound represented by the general formula (I-36) could be polymerized without using a polymerization initiator, and that the content of the unpolymerized material remaining after the polymerization was equal to or less than the detection limit.

Example 5

A polymerizable liquid crystal composition CLC-8 was prepared by adding 0.3% of a polymerizable compound represented by the general formula (I-37) to 99.7% of the liquid crystal composition LC-1 and uniformly dissolving the polymerizable compound. The CLC-8 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm$^2$ to obtain a homeotropic-alignment liquid crystal display element in which the polymerizable compound in the polymerizable liquid crystal composition was polymerized. The pretilt angle before the ultraviolet irradiation of the element was 89.7 degrees whereas the pretilt angle after the ultraviolet irradiation was 87.3 degrees, which means that a pretilt was provided. The content of the compound represented by the general formula (I-37) in the element was analyzed by liquid chromatography, but the content was equal to or less than the detection limit. Thus, it was confirmed that the polymerizable compound represented by the general formula (I-37) could be polymerized without using a polymerization initiator, and that the content of the unpolymerized material remaining after the polymerization was equal to or less than the detection limit.

Example 6

A polymerizable liquid crystal composition CLC-9 was prepared by adding 0.3% of a polymerizable compound represented by the general formula (I-38) to 99.7% of the liquid crystal composition LC-1 and uniformly dissolving the polymerizable compound. The CLC-9 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid, crystal composition was polymerized. The pretilt angle before the ultraviolet irradiation of the element was 89.6 degrees whereas the pretilt angle after the ultraviolet irradiation was 87.7 degrees, which means that a pretilt was provided. The content of the compound represented by the general formula (I-38) in the element was analyzed by liquid chromatography, but the content was equal to or less than the detection limit. Thus, it was confirmed that the polymerizable compound represented by the general formula (I-38) could be polymerized without using a polymerization initiator, and that the content of the unpolymerized material remaining after the polymerization was equal to or less than the detection limit.

Example 7

A polymerizable liquid crystal composition CLC-10 was prepared by adding 0.3% of a polymerizable compound represented by the general formula (I-39) to 99.7% of the liquid crystal composition LC-1 and uniformly dissolving the polymerizable compound. The CLC-10 was injected, by a vacuum injection method, into a cell with ITO, the cell having a cell, gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts of ultraviolet light with a wavelength of 320 nm or less while a square wave of 1.3 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before the ultraviolet irradiation of the element was 89.7 degrees whereas the pretilt angle after the ultraviolet irradiation was 87.1 degrees, which means that a pretilt was provided. The content of the compound represented by the general formula (I-39) in the element was analyzed by liquid chromatography, but the content was equal to or less than the detection limit. Thus, it was confirmed that the polymerizable compound represented by the general formula (I-39) could be polymerized without using a polymerization initiator, and that the content of the unpolymerized, material remaining after the polymerization was equal to or less than the detection limit.

Example 8

A liquid crystal composition LC-2 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-2 contained the following constituent components.

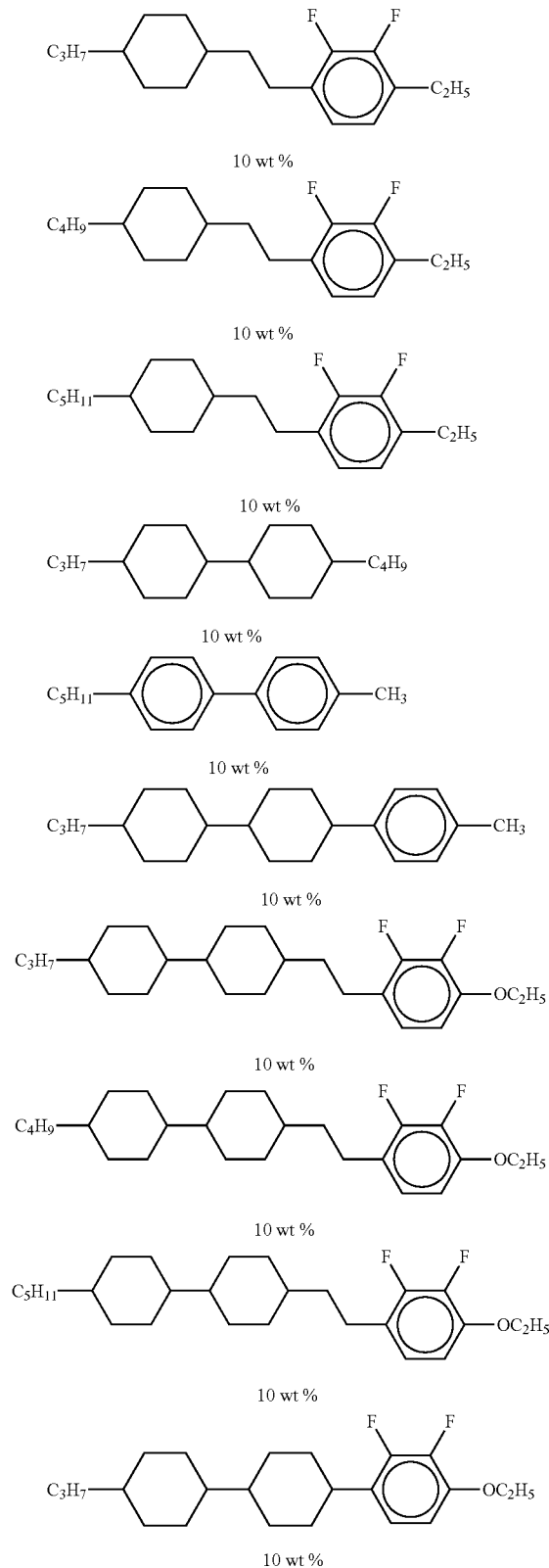

Table 3 shows the physical properties of the liquid crystal composition LC-2.

TABLE 3

| $T_{N-I}(°C.)$ | 85 |
|---|---|
| Δε | −3.4 |
| Δn | 0.094 |

A polymerizable liquid crystal composition CLC-4 was prepared by adding 0.3% of a polymerizable compound represented by the general formula (I-1) to 99.7% of the liquid crystal composition LC-2 and uniformly dissolving the polymerizable compound. The CLC-4 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before The ultraviolet irradiation of the element was 89.6 degrees whereas the pretilt angle after the ultraviolet irradiation was 87.4 degrees, which means that a pretilt was provided. The content of the compound represented by the general formula (I-1) in the element was analyzed by liquid chromatography, but the content was equal to or less than the detection limit. Thus, it was confirmed that the polymerizable compound represented by the general formula (I-1) could be polymerized without using a polymerization initiator, and that the content of the unpolymerized material remaining after the polymerization was equal to or less than the detection limit.

Example 9

A liquid crystal composition LC-3 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-3 contained the following constituent components.

[Chem. 35]

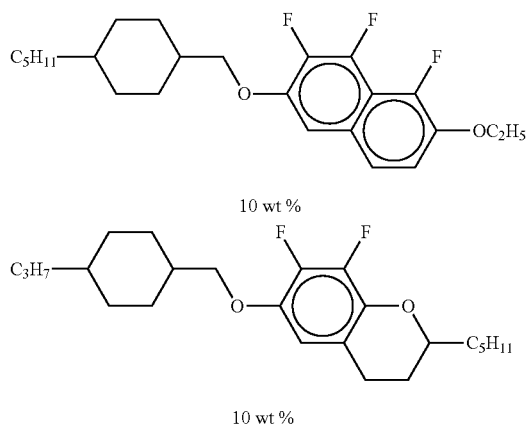

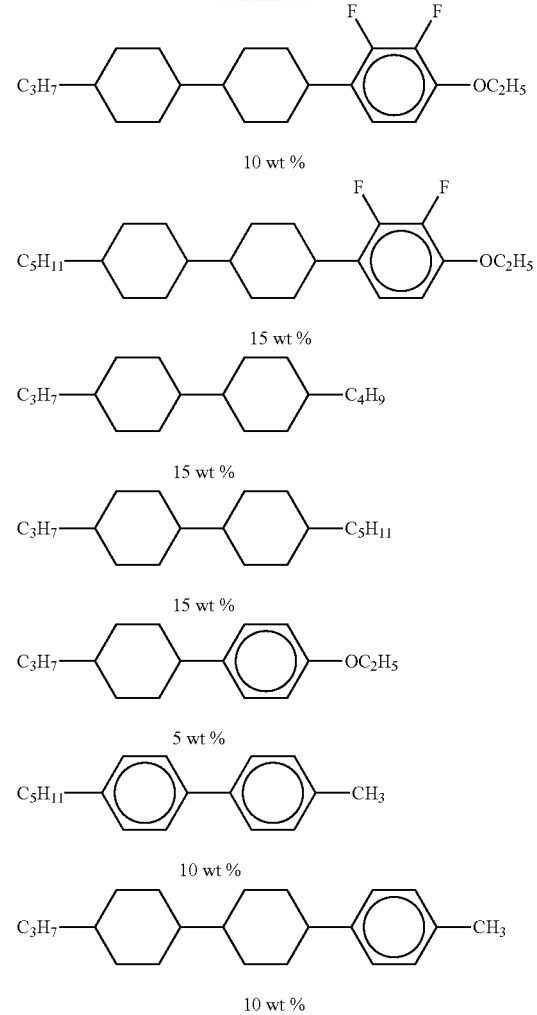

Table 4 shows the physical properties of the liquid crystal composition LC-3.

TABLE 4

| $T_{N-I}(°C.)$ | 72 |
|---|---|
| Δε | −3.3 |
| Δn | 0.086 |

A polymerizable liquid crystal composition CLC-5 was prepared by adding 0.3% of a polymerizable compound represented by the general formula (I-1) to 99.7% of the liquid crystal composition LC-3 and uniformly dissolving the polymerizable compound. The CLC-5 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in The polymerizable liquid crystal composition was polymerized. The pretilt angle before The ultraviolet irradiation of the element was 89.5 degrees whereas the pretilt angle after the ultraviolet irradiation was 87.1 degrees, which means that a pretilt was provided. The content of the compound represented by the general formula (I-1) in the element was analyzed by liquid chromatography, but the content was equal to or less than the detection limit. Thus, it was confirmed that the polymerizable compound represented by the general formula (I-1) could be polymerized without using a polymerization initiator, and that the content of the unpolymerized material remaining after the polymerization was equal to or less than the detection limit.

Example 10

A liquid crystal composition LC-4 containing compounds selected from the compounds represented by the general formula GM and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-4 contained the following constituent components.

[Chem. 36]

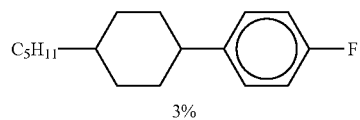

3%

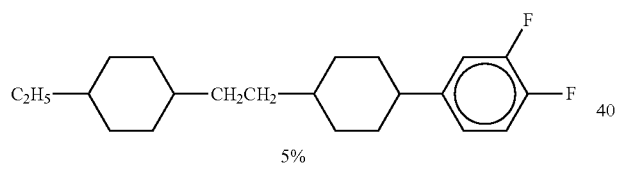

5%

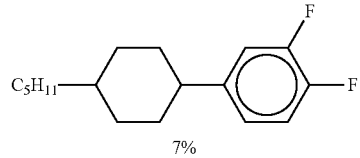

7%

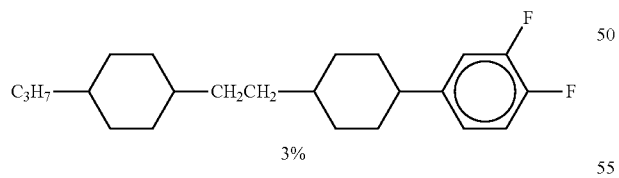

3%

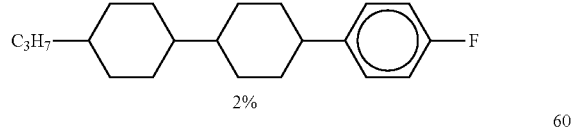

2%

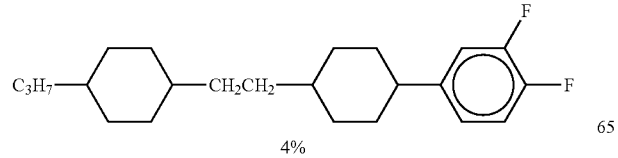

4%

-continued

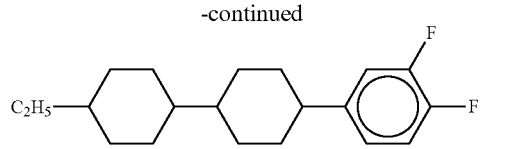

7.5%

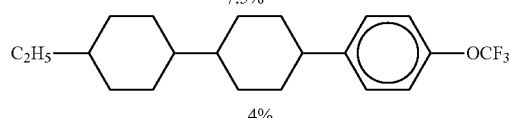

4%

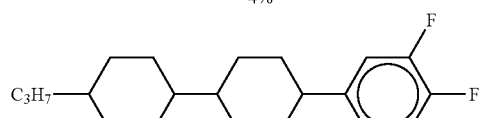

7.5%

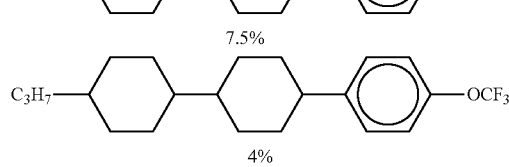

4%

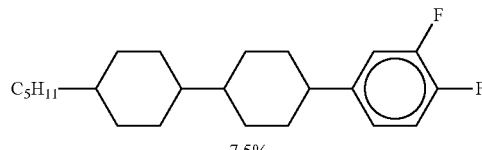

7.5%

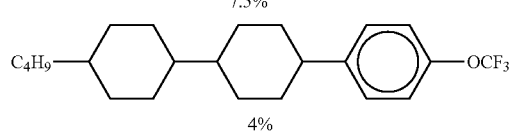

4%

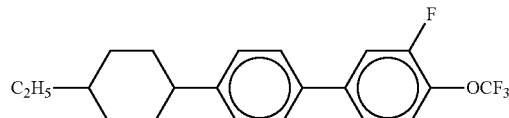

4%

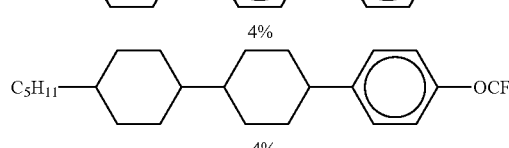

4%

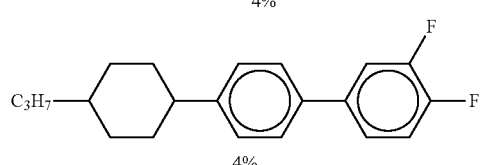

4%

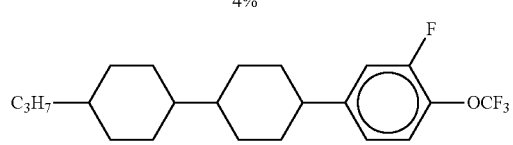

5%

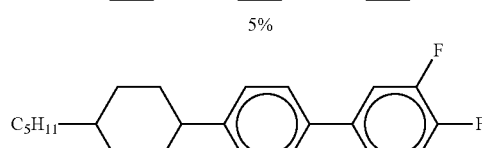

3%

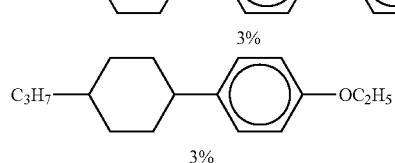

3%

-continued

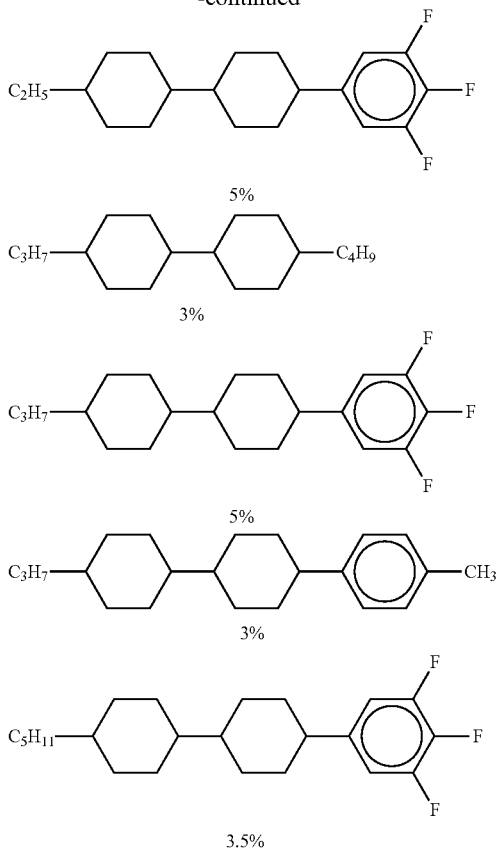

Table 5 shows the physical properties of the liquid crystal composition LC-4.

TABLE 5

| $T_{N-I}(°C.)$ | 85 |
|---|---|
| Δε | −5.5 |
| Δn | 0.090 |

A polymerizable liquid crystal composition CLC-6 was prepared by adding 0.3% of a polymerizable compound represented by the general formula (I-1) to 99.7% of the liquid crystal composition LC-4 and uniformly dissolving the polymerizable compound. The CLC-6 was injected, by a vacuum injection method, into a cell with ITO, the cell having a cell gap of 3.5 μm and including polyimide alignment, layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before the ultraviolet irradiation of the element was 0.2 degrees whereas the pretilt angle after the ultraviolet irradiation was 3.1 degrees, which means that a pretilt was provided. The content of the compound represented by the general formula (I-1) in the element was analyzed by liquid chromatography, but the content was equal to or less than the detection limit. Thus, it was confirmed that the polymerizable compound represented by the general formula (I-1) could be polymerized without using a polymerization initiator, and that the content of the unpolymerized material remaining after the polymerization was equal to or less than the detection limit.

Example 11

A liquid crystal composition LC-5 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVb) was prepared. The liquid crystal composition LC-5 contained the following constituent components.

[Chem. 37]

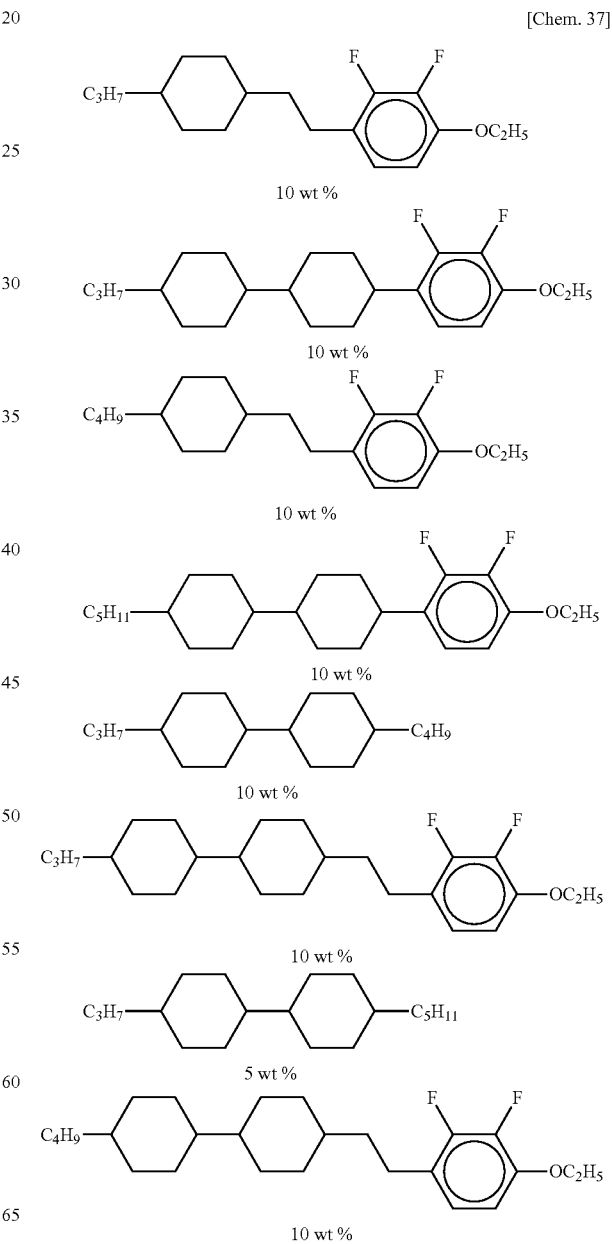

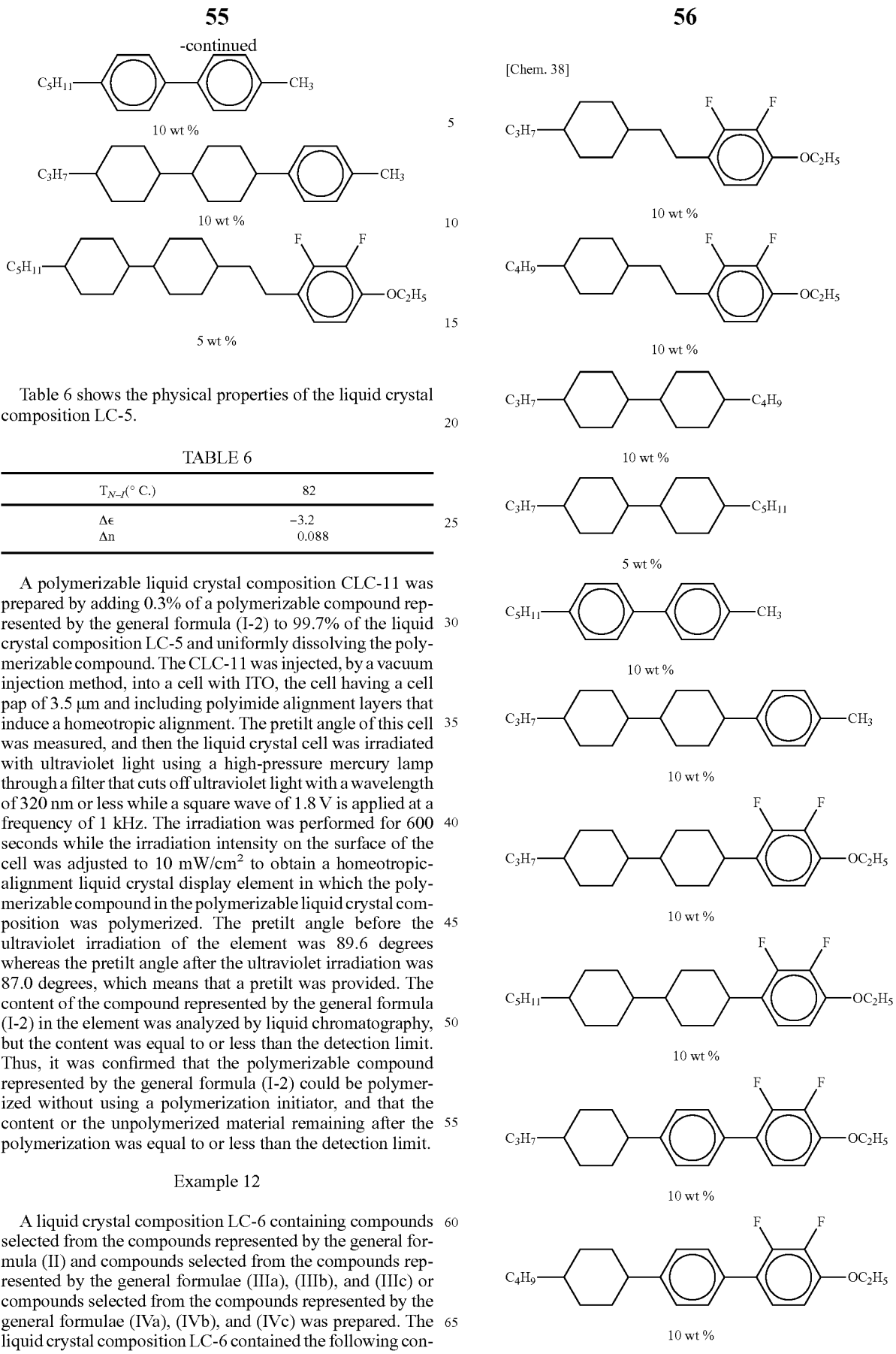

Table 6 shows the physical properties of the liquid crystal composition LC-5.

TABLE 6

| | |
|---|---|
| $T_{N-I}$ (° C.) | 82 |
| Δε | −3.2 |
| Δn | 0.088 |

A polymerizable liquid crystal composition CLC-11 was prepared by adding 0.3% of a polymerizable compound represented by the general formula (I-2) to 99.7% of the liquid crystal composition LC-5 and uniformly dissolving the polymerizable compound. The CLC-11 was injected, by a vacuum injection method, into a cell with ITO, the cell having a cell pap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before the ultraviolet irradiation of the element was 89.6 degrees whereas the pretilt angle after the ultraviolet irradiation was 87.0 degrees, which means that a pretilt was provided. The content of the compound represented by the general formula (I-2) in the element was analyzed by liquid chromatography, but the content was equal to or less than the detection limit. Thus, it was confirmed that the polymerizable compound represented by the general formula (I-2) could be polymerized without using a polymerization initiator, and that the content or the unpolymerized material remaining after the polymerization was equal to or less than the detection limit.

Example 12

A liquid crystal composition LC-6 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVc) was prepared. The liquid crystal composition LC-6 contained the following constituent components.

-continued

C₅H₁₁—[Cy]—[Ph]—[Ph(2,3-F)]—OC₂H₅

5 wt %

Table 7 shows the physical properties of the liquid crystal composition LC-6.

TABLE 7

| $T_{N-I}(°C.)$ | 80 |
|---|---|
| Δε | −3.3 |
| Δn | 0.103 |

A polymerizable liquid crystal composition CLC-12 was prepared by adding 0.3% of a polymerizable compound represented by the general formula (I-37) to 99.7% of the liquid crystal composition LC-6 and uniformly dissolving the polymerizable compound. The CLC-12 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before the ultraviolet irradiation of the element was 89.8 degrees whereas the pretilt angle after the ultraviolet irradiation was 86.5 degrees, which means that a pretilt was provided. The content of the compound represented by the general formula (I-37) in the element was analyzed by liquid chromatography, but the content was equal to or less than the detection limit. Thus, it was confirmed that the polymerizable compound represented by the general formula (I-37) could be polymerized without using a polymerization initiator, and that the content of the unpolymerized material remaining after the polymerization was equal to or less than the detection limit.

Example 13

A liquid crystal composition LC-7 containing compounds selected from the compounds represented by the general formula (II) and compounds selected from the compounds represented by the general formulae (IIIa), (IIIb), and (IIIc) or compounds selected from the compounds represented by the general formulae (IVa), (IVb), and (IVb) was prepared. The liquid crystal composition LC-7 contained the following constituent components.

[Chem. 39]

C₃H₇—[Cy]—[Ph(2,3-F)]—OC₂H₅

10 wt %

C₃H₇—[Cy]—[Cy]—[Ph(2,3-F)]—OC₂H₅

10 wt %

C₃H₇—[Ph]—[Ph(2,3-F)]—OC₂H₅

5 wt %

C₅H₁₁—[Cy]—[Cy]—[Ph(2,3-F)]—OC₂H₅

10 wt %

C₃H₇—[Cy]—CH₂CH₂—[Ph(2,3-F)]—C₂H₅

10 wt %

C₃H₇—[Cy]—[Cy]—CH₂CH₂—[Ph(2,3-F)]—OC₂H₅

10 wt %

C₃H₇—[Cy]—[Cy]—C₄H₉

10 wt %

C₃H₇—[Cy]—[Ph]—[Ph(2,3-F)]—OC₂H₅

5 wt %

C₃H₇—[Cy]—[Cy]—C₅H₁₁

10 wt %

C₃H₇—[Cy]—[Cy]—[Ph]—CH₃

10 wt %

C₃H₇—[Cy]—[Ph]—[Ph(2,3-F)]—OC₂H₅

5 wt %

-continued

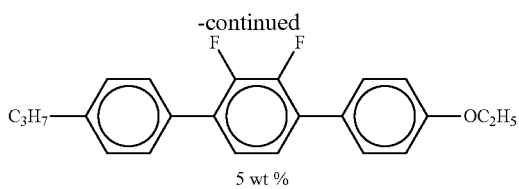

5 wt %

Table 8 shows the physical properties of the liquid crystal composition LC-7.

TABLE 8

| $T_{N-I}(°C.)$ | 75 |
|---|---|
| Δε | −3.1 |
| Δn | 0.115 |

A polymerizable liquid crystal composition CLC-13 was prepared by adding 0.3% of a polymerizable compound represented by the general formula (I-37) to 99.7% of the liquid crystal composition LC-7 and uniformly dissolving the polymerizable compound. The CLC-13 was injected, by a vacuum injection method, into a cell with ITO, the cell having a cell gap of 3.5 μm and including polyimide alignment layers that induce a homeotropic alignment. The pretilt angle of this cell was measured, and then the liquid crystal cell was irradiated with ultraviolet light using a high-pressure mercury lamp through a filter that cuts off ultraviolet light with a wavelength of 320 nm or less while a square wave of 1.8 V is applied at a frequency of 1 kHz. The irradiation was performed for 600 seconds while the irradiation intensity on the surface of the cell was adjusted to 10 mW/cm² to obtain a homeotropic-alignment liquid crystal display element in which the polymerizable compound in the polymerizable liquid crystal composition was polymerized. The pretilt angle before the ultraviolet irradiation of the element was 89.7 degrees whereas the pretilt angle after the ultraviolet irradiation was 86.6 degrees, which means that a pretilt was provided. The content of the compound represented by the general formula (I-37) in the element was analyzed by liquid chromatography, but the content was equal to or less than the detection limit. Thus, it was confirmed that the polymerizable compound represented by the general formula (I-37) could be polymerized without using a polymerization initiator, and that the content of the unpolymerized material remaining after the polymerization was equal to or less than the detection limit.

Example 14 and Comparative Example 2

A voltage was applied to the liquid crystal display elements after polymerization, the liquid crystal display elements being produced in Examples 1 to 13 and Comparative Example 1, and the state of image sticking was visually observed with elapsed time. (Symbol A represents that no change was observed. Symbol B represents that image sticking was observed. Herein, the image sticking become more severe as the number of symbol B increases.)

TABLE 9

|  | After 10 hours | After 50 hours | After 100 hours | After 500 hours |
|---|---|---|---|---|
| Example 1 | A | A | A | A |
| Example 2 |  |  |  |  |
| Example 3 |  |  |  |  |

TABLE 9-continued

|  | After 10 hours | After 50 hours | After 100 hours | After 500 hours |
|---|---|---|---|---|
| Example 4 |  |  |  |  |
| Example 5 |  |  |  |  |
| Example 6 |  |  |  |  |
| Example 7 |  |  |  |  |
| Example 8 |  |  |  |  |
| Example 9 |  |  |  |  |
| Example 10 |  |  |  |  |
| Example 11 |  |  |  |  |
| Example 12 |  |  |  |  |
| Example 13 |  |  |  |  |
| Comparative Example 1 |  | B | BB | BBB |

In the liquid crystal display element produced in Comparative Example 1, image sticking occurred after 48 hours from the start of display, and display failure was observed over the substantially entire surface after 168 hours. In contrast, in the liquid crystal display elements produced in Examples 1 to 13, a satisfactory display state was maintained even after 500 hours had passed. Accordingly, it was confirmed that liquid crystal display elements in which all polymerizable materials were polymerized and consumed as in the compounds of the present invention had high reliability.

INDUSTRIAL APPLICABILITY

The liquid crystal composition is useful as a liquid crystal material for liquid crystal display elements.

The invention claimed is:

1. A liquid crystal composition comprising:
as a first component, at least one compound selected from polymerizable compounds represented by general formula (I):

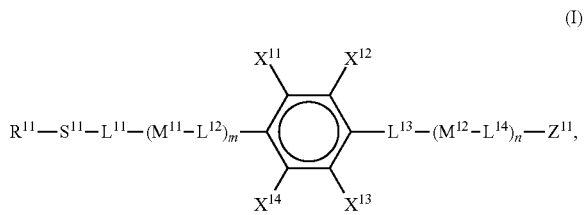

(I)

wherein $R^{11}$ is selected from structures represented by formulae (R-1) to (R-15) below:

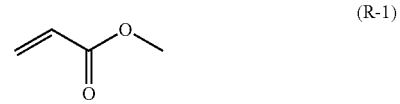

(R-1)

(R-2)

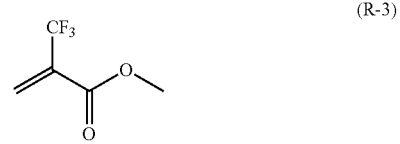

(R-3)

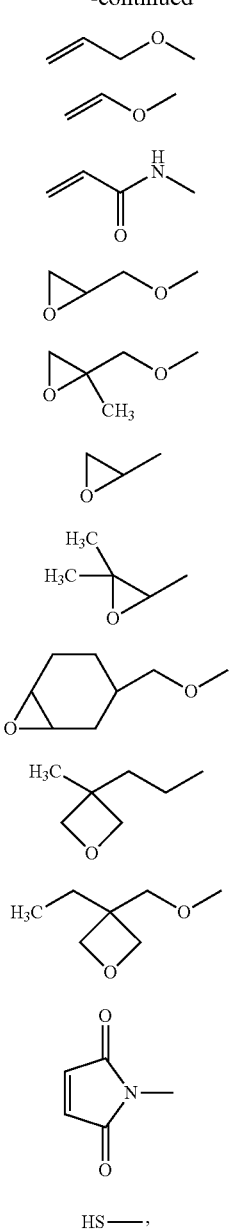

(R-4)
(R-5)
(R-6)
(R-7)
(R-8)
(R-9)
(R-10)
(R-11)
(R-12)
(R-13)
(R14)
(R-15)

$S^{11}$ represents a single bond or an alkylene group having 1 to 12 carbon atoms, where a methylene group in the alkylene group may be substituted with an oxygen atom, —COO—, —OCO—, or —OCOO— as long as oxygen atoms are not directly bonded to each other, $Z^{11}$ represents a hydrogen atom, a fluorine atom, a chlorine atom, a cyano group, a thiocyanate group, a trifluoromethoxy group, a trifluoromethyl group, a difluoromethoxy group, an alkyl group having 1 to 12 carbon atoms, where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, or —$S^{12}$—$R^{12}$, wherein $R^{12}$ independently has the same meaning as $R^{11}$, and $S^{12}$ independently has the same meaning as $S^{11}$, $X^{11}$, $X^{12}$, $X^{13}$, and $X^{14}$ each independently represent a hydrogen atom, an alkyl group, an alkyl halide group, an alkoxy group, an alkoxy halide group, a halogen, a cyano group, or a nitro group, $L^{11}$, $L^{12}$, and $L^{14}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CONR$^1$—, —NR$^1$—CO—, —SCH$_2$—, —CH$_2$S—, —CH=CH—COO—, —COO—CH=CH—, —OCO—CH=CH—, —CH=CH-OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or C≡C—, where $R^a$ represents an alkyl group having 1 to 4 carbon atoms, $L^{13}$ represents —CH=CH—COO—, —CH=CH—OCO—, —COO—CH=CH—, or —OCO—CH=CH—, $M^{11}$ and $M^{12}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthatene-2,6-diyl group, or a 1,3-dioxane-2,5-diyl group, where hydrogen atoms in the groups of $M^{11}$ and $M^{12}$ are each independently unsubstituted or substituted with a fluorine atom, a chlorine atom, a cyano group, an alkyl group having 1 to 8 carbon atoms, an alkyl halide group, an alkoxy halide group, an alkoxy group, or a nitro group, and m represents 0 or 1 and n represents 1, 2, or wherein when n represents 2 or 3, two or three $M^{12}$s may be the same as or different from each other and two or three $L^{14}$s may be the same as or different from each other;

as a second component, at east one compound represented by general formula (II):

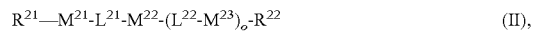

wherein $R^{21}$ and $R^{22}$ each independently represent an alkyl group having 1 to 10 carbon atoms or an alkenyl group having 2 to 10 carbon atoms, where a methylene group or two or more methylene groups that are not adjacent to each other in these groups may be substituted with —O— or —S—, and at least one hydrogen atom in these groups may be substituted with a fluorine atom or a chlorine atom, $M^{21}$, $M^{22}$, and $M^{23}$ each independently represent a group selected from:

(a) a trans-1,4-cyclohexylene group where a methylene group or two or more methylene groups that are not adjacent to each other in the cyclohexylene group may be substituted with —O— or —S—, (b) a 1,4-phenylene group where one —CH= or two or more —CH= that are not adjacent to each other in the phenylene group may be substituted with a nitrogen atom, a 3-fluoro-1,4-phenylene group, and a 3,5-difluoro-1,4-phenylene group, and (c) a 1,4-cyclohexenylene group, a 1,4-bicyclo(2.22)octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, $L^{21}$ and $L^{22}$ each independently represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—, wherein when a plurality of $L^{22}$s are present, $L^{22}$s may be the same as or different from each other, and when a plurality of $M^{23}$s are present, $M^{23}$s may be the same as or different from each other; and as a third component, at least one compound selected from the group consisting of compounds represented by general formulae (IIIa), (IIIb), and (IIIc) or the group consisting of compounds represented by general formulae (IVa), (IVb), and (IVc):

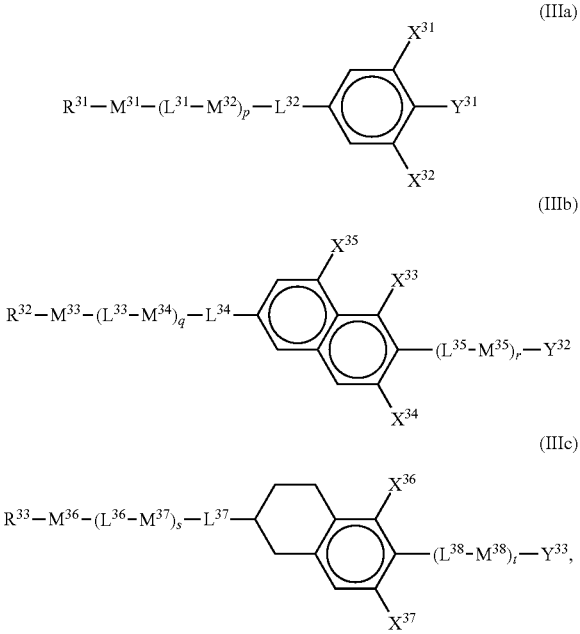

(IIIa)

(IIIb)

(IIIc)

wherein $R^{31}$, $R^{32}$, and $R^{33}$ each independently represent an alkyl group having 1 to 10 carbon atoms or an alkenyl group having 2 to 10 carbon atoms, where a methylene group or two or more methylene groups that are not adjacent to each other in these groups may be substituted with —O— or —S—, and at least one hydrogen atom in these groups may be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from:

(d) trans-1,4-cyclohexylene group where a methylene group or two or more methylene groups that are not adjacent to each other in the cyclohexylene group may be substituted with —O— or —S—, (e) a 1,4-phenylene group where one —CH= or two or more —CH= that are not adjacent to each other in the phenylene group may be substituted with a nitrogen atom, a 3-fluoro-1,4-phenylene group, and a 3,5-difluoro-1,4-phenylene group, and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom in the group (d), groups (e), or groups (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, wherein when a plurality of $M^{32}$s, $M^{34}$s, $M^{35}$s, $M^{37}$s, $M^{38}$s, $L^{31}$s, $L^{33}$s, $L^{35}$s, $L^{36}$s, and/or $L^{38}$s are present, they may be the same or different, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent hydrogen atom, a fluorine atom, a chlorine atom, a cyano group, a thiocyanate group, a trifluoromethoxy group, a trifluoromethyl group, a 2,2,2-trifluoroethyl group, or a difluoromethoxy group, at least one of $X^{31}$, $X^{32}$, and $Y^{31}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of hydrogen atoms in $M^{31}$ or $M^{32}$ represents a cyano group, a fluorine atom, a trifluoromethyl group, a trifluoromethoxy group, or a chlorine atom, at least one of $X^{33}$, $X^{34}$, $X^{35}$ and $Y^{32}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of hydrogen atoms in $M^{33}$, $M^{34}$, or $M^{35}$ represents a cyano group, a fluorine atom, a trifluoromethyl group, a trifluoromethoxy group, or a chlorine atom, at least one of $X^{36}$, $X^{37}$, and $Y^{33}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of hydrogen atoms in $M^{36}$, $M^{37}$, or $M^{38}$ a cyano group, a fluorine atom, a trifluoromethyl group, a trifluoromethoxy group, or a chlorine atom, and p, q, r, s, and t each independently represent 0, 1, or 2, where q+r and s+t are each 2 or less,

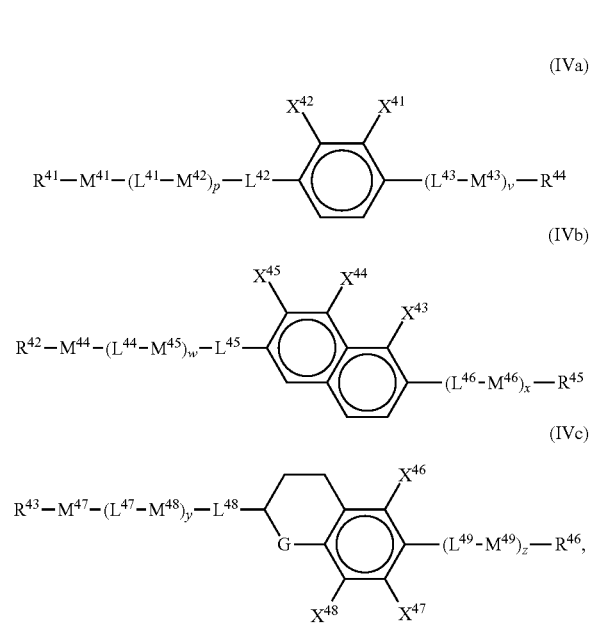

(IVa)

(IVb)

(IVc)

wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, where a methylene group or two or more methylene groups that are not adjacent to each other in these groups may be substituted with —O— or —S—, and at least one hydrogen atom in these groups may be substituted with a fluorine atom or a chlorine atom, $M^{41}$, $M^{42}$, $M^{43}$, $M^{33}$, $M^{45}$, $M^{46}$, $M^{47}$, $M^{38}$, and $M^{49}$ each independently represent a group selected from:

(d) a trans-1,4-cyclohexylene group where a methylene group or two or more methylene groups that are not adjacent to each other in the cyclohexylene group may be substituted with —O— or —S—, (e) a 1,4-phenylene group where one —CH= or two or more —CH= that are not adjacent to each other in this the phenylene group may be substituted with a nitrogen atom, a 3-fluoro-1,4-phenylene group, and a 3,5-difluoro-1,4-phenylene group, and (f) a 1,4-cyclohexenylene group, a 1,4-bicyclo(2.2.2)octylene group, a piperidine-2,5-diyl group, a napthalene-2,6-diyl group, a 1,2,3,4-tetrahydronaphthatene-2,6-diyl group, and a decahydronaphthalene-2,6-diyl group, a hydrogen atom in the group (d), group (e), or groups (f) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —OCF$_2$—, —CF$_2$O—, or —C≡C—, wherein when a plurality of $M^{42}$s, $M^{43}$s, $M^{45}$s, $M^{46}$s, $M^{48}$s, $M^{49}$s, $L^{41}$s, $L^{43}$s, $L^{44}$s, $L^{46}$s, $L^{47}$s, and/or $L^{49}$s are present, they may be the same or different, $X^{41}$ and $X^{42}$ each independently represent a trifluoromethyl group, a trifluoromethoxy group, or a fluorine atom and $X^{43}$, $X^{44}$, $X^{45}$, $X^{46}$, $X^{47}$ and $X^{48}$ each independently represent a hydrogen atom, a trifluoromethyl group, a trifluoromethoxy group, or a fluorine atom, but at least one of $X^{41}$ and $X^{42}$ represents a fluorine atom, at least one of $X^{43}$, $X^{44}$, and $X^{45}$ represents a fluorine atom, and at least one of $X^{46}$, $X^{47}$ and $X^{48}$ represents a fluorine atom, where $X^{46}$ and $X^{47}$ do not represent fluorine atoms at the same time and $X^{46}$ and $X^{48}$ do not represent fluorine atoms at the same time, G represents a methylene group or —O—, and u, v, w, x, y, and z each independently represent 0, 1, or 2, where u+v, w+x, and y+z are each 2 or less.

2. The liquid crystal composition according to claim 1, wherein, in the general formula (I), when $Z^{11}$ represents —S$^{12}$—R$^{12}$, at least one of S$^{11}$ and S$^{21}$ represents an alkylene group having 2 to 12 carbon atoms, where a carbon atom may be substituted with an oxygen atom, —COO—, —OCO—, or —OCOO— as long as oxygen atoms are not directly bonded to each other.

3. The liquid crystal composition according to claim 1, wherein the liquid crystal composition is used in a liquid crystal display element that has a structure in which a liquid crystal is interposed between a pair of substrates, that includes at least a transparent electrode and a polarizing plate, and to which a liquid crystal alignment capability is provided by polymerizing the polymerizable compound contained in the liquid crystal composition.

4. The liquid crystal composition according to claim 1, wherein the liquid crystal composition contains 001 to 2% by mass of the compound selected from the general formula (I), 5 to 70% by mass of the compound selected from the general formula (II), and 5 to 70% by mass of the compound selected from the group consisting of the compounds represented by the general formulae (IIIa), (IIIb), and (IIIc) or the compound selected from the group consisting of the compounds represented by the general formulae (IVa), (IVb), and (IVc).

5. The liquid crystal composition according to claim 1, wherein the liquid crystal composition contains, as a third component, at least one of the compounds represented by the general formulae (IVa), (IVb), and (IVc).

6. A liquid crystal display element comprising the liquid crystal composition according to claim 1, wherein a liquid crystal alignment capability is provided by polymerizing the polymerizable compound contained in the liquid crystal composition.

7. The liquid crystal display element according to claim 6, wherein the liquid crystal composition has a negative dielectric anisotropy.

* * * * *